US011748913B2

(12) United States Patent
Ali et al.

(10) Patent No.: US 11,748,913 B2
(45) Date of Patent: Sep. 5, 2023

(54) MODELING OBJECTS FROM MONOCULAR CAMERA OUTPUTS

(71) Applicant: QUALCOMM Incorporated, San Diego, CA (US)

(72) Inventors: Ashar Ali, San Diego, CA (US); Gokce Dane, San Diego, CA (US); Upal Mahbub, San Diego, CA (US); Samuel Sunarjo, San Diego, CA (US); Gerhard Reitmayr, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 17/189,105

(22) Filed: Mar. 1, 2021

(65) Prior Publication Data

US 2022/0277489 A1 Sep. 1, 2022

(51) Int. Cl.
*G06N 3/08* (2023.01)
*G06T 17/00* (2006.01)
(Continued)

(52) U.S. Cl.
CPC .............. *G06T 7/97* (2017.01); *G06N 3/08* (2013.01); *G06T 7/80* (2017.01); *G06T 17/20* (2013.01);
(Continued)

(58) Field of Classification Search
None
See application file for complete search history.

(56) References Cited

U.S. PATENT DOCUMENTS

2014/0016821 A1* 1/2014 Arth .................. G06T 7/80
382/103
2014/0201126 A1* 7/2014 Zadeh ................. A61B 5/165
706/52
(Continued)

FOREIGN PATENT DOCUMENTS

WO 2020254448 A1 12/2020

OTHER PUBLICATIONS

Kissos et al., "Beyond Weak Perspective for Monocular 3D Human Pose Estimation," arXiv:2009.06549v1 [cs.CV] Sep. 14, 2020 (Year: 2020).*
(Continued)

*Primary Examiner* — Soo Shin
(74) *Attorney, Agent, or Firm* — QUALCOMM Incorporated

(57) ABSTRACT

Systems and techniques are provided for modeling three-dimensional (3D) meshes using images. An example method can include receiving, via a neural network system, an image of a target and metadata associated with the image and/or a device that captured the image; determining, based on the image and metadata, first 3D mesh parameters of a first 3D mesh of the target, the first 3D mesh parameters and first 3D mesh corresponding to a first reference frame associated with the image and/or the device; and determining, based on the first 3D mesh parameters, second 3D mesh parameters for a second 3D mesh of the target, the second 3D mesh parameters and second 3D mesh corresponding to a second
(Continued)

reference frame, the second reference frame including a 3D coordinate system of a real-world scene where the target is located.

28 Claims, 8 Drawing Sheets

(51) Int. Cl.
 *G06T 17/20* (2006.01)
 *G06T 7/00* (2017.01)
 *G06T 7/80* (2017.01)
(52) U.S. Cl.
 CPC ............... *G06T 2207/20081* (2013.01); *G06T 2207/20084* (2013.01)

(56) References Cited

U.S. PATENT DOCUMENTS

| 2021/0295606 | A1* | 9/2021 | Kim | G06T 17/20 |
| 2021/0312701 | A1* | 10/2021 | Vrcelj | G06T 15/503 |
| 2022/0358770 | A1* | 11/2022 | Guler | G06T 7/50 |

OTHER PUBLICATIONS

Baek S., et al., "Pushing the Envelope for RGB-Based Dense 3D Hand Pose Estimation via Neural Rendering", 2019 IEEE/CVF Conference on Computer Vision and Pattern Recognition (CVPR), IEEE, Jun. 15, 2019, pp. 1067-1076, XP033687323, DOI: 10.1109/CVPR.2019.00116 [retrieved on Jan. 8, 2020] the whole document.
Ge L., et al., "3D Hand Shape and Pose Estimation from a Single RGB Image", 2019 IEEE/CVF Conference on Computer Vision and Pattern Recognition (CVPR), IEEE, Jun. 15, 2019, pp. 10825-10834, XP033686696, DOI: 10.1109/CVPR.2019.01109 [retrieved on Jan. 8, 2020] the whole document.
International Search Report and Written Opinion—PCT/US2022/017691—ISA/EPO—dated Jul. 15, 2022.
Kissos I., et al., "Beyond Weak Perspective for Monocular 3D Human Pose Estimation : Glasgow, UK, Aug. 23-28, 2020, Proceedings, Part II", In : "Pattern Recognition : 5th Asian Conference, ACPR 2019, Auckland, New Zealand, Nov. 26-29, 2019, Revised Selected Papers, Part II", 2020, Springer International Publishing, XP055937351, ISSN: 0302-9743, ISBN: 978-3-030-41298-2, vol. 12536, pp. 541-554, DOI: 10.1007/978-3-030-66096-3_37.

* cited by examiner

MODELING OBJECTS FROM MONOCULAR CAMERA OUTPUTS

TECHNICAL FIELD

The present disclosure generally relates to image processing, and more specifically to systems and techniques for generating three-dimensional models of objects.

BACKGROUND

Many devices and systems are capable of generating images (or frames) and/or video data (including multiple frames) that capture scenes, objects, people, and shapes, among other things. For example, a camera or a computing device including a camera (e.g., a mobile device such as a mobile telephone or smart device including one or more cameras) can capture an image of a scene, a person, and/or an object. The image can be captured and processed by such devices and systems and output for consumption (e.g., displayed on a device). The image captured can also be processed for certain applications such as, for example, computer graphics, extended reality (e.g., augmented reality, virtual reality, and the like), image recognition (e.g., face recognition, object recognition, scene recognition, etc.), object detection, and feature estimation, among others. For example, an image can be processed to detect any objects or faces that are present in the image, which can be useful for various applications.

In some cases, image data captured by a device can be used to construct a three-dimensional (3D) model of a target (e.g., an object, person, shape, etc.) in the image data. The 3D model can be used in a variety of applications such as, for example, multimedia (e.g., movies, video games, extended reality, etc.), computer vision (e.g., motion tracking, shape modeling, object mapping, image recognition, pose estimation, image registration and warping, scene reconstruction, image segmentation, animation, etc.), robotics and automation, industrial design, and health care, among others. 3D modeling can be challenging and complex, particularly when modeling articulated objects. Moreover, 3D modeling technologies are often inaccurate and inconsistent, and have difficulty dealing with noise, ambiguities, and configuration changes, among other things.

BRIEF SUMMARY

In some examples, systems and techniques are described for three-dimensional (3D) modeling of objects. According to at least one illustrative example, a method of 3D modeling an object as a skinned mesh from an image sensor output is provided. In some examples, the method can include receiving an image of a target and metadata, the metadata associated with at least one of the image and an image capture device that captured the image; determining, based on the image and the metadata, first three-dimensional (3D) mesh parameters of a first 3D mesh of the target, the first 3D mesh parameters and the first 3D mesh corresponding to a first reference frame associated with the image and/or the image capture device; and determining, based on the first 3D mesh parameters, second 3D mesh parameters for a second 3D mesh of the target, the second 3D mesh parameters and the second 3D mesh corresponding to a second reference frame, the second reference frame including a 3D coordinate system of a real-world scene in which the target is located.

According to at least one illustrative example, a non-transitory computer-readable medium is provided for 3D modeling an object as a skinned mesh from an image sensor output is provided. In some aspects, the non-transitory computer-readable medium can include instructions that, when executed by one or more processors, cause the one or more processors to receive an image of a target and metadata, the metadata associated with the image and/or an image capture device that captured the image; determine, based on the image and the metadata, first three-dimensional (3D) mesh parameters of a first 3D mesh of the target, the first 3D mesh parameters and the first 3D mesh corresponding to a first reference frame associated with the image and/or the image capture device; and determine, based on the first 3D mesh parameters, second 3D mesh parameters for a second 3D mesh of the target, the second 3D mesh parameters and the second 3D mesh corresponding to a second reference frame, the second reference frame including a 3D coordinate system of a real-world scene in which the target is located.

According to at least one illustrative example, an apparatus is provided for 3D modeling an object as a skinned mesh from an image sensor output. In some aspects, the apparatus can include memory having stored thereon computer-readable instructions and one or more processors configured to receive an image of a target and metadata, the metadata associated with the image and/or an image capture device that captured the image; determine, based on the image and the metadata, first three-dimensional (3D) mesh parameters of a first 3D mesh of the target, the first 3D mesh parameters and the first 3D mesh corresponding to a first reference frame associated with the image and/or the image capture device; and determine, based on the first 3D mesh parameters, second 3D mesh parameters for a second 3D mesh of the target, the second 3D mesh parameters and the second 3D mesh corresponding to a second reference frame, the second reference frame including a 3D coordinate system of a real-world scene in which the target is located.

According to another illustrative example, an apparatus for 3D modeling an object as a skinned mesh from an image sensor output can include means for receiving an image of a target and metadata, the metadata associated with the image and/or an image capture device that captured the image; determining, based on the image and the metadata, first three-dimensional (3D) mesh parameters of a first 3D mesh of the target, the first 3D mesh parameters and the first 3D mesh corresponding to a first reference frame associated with the image and/or the image capture device; and determining, based on the first 3D mesh parameters, second 3D mesh parameters for a second 3D mesh of the target, the second 3D mesh parameters and the second 3D mesh corresponding to a second reference frame, the second reference frame including a 3D coordinate system of a real-world scene in which the target is located.

In some aspects, the method, apparatuses, and computer-readable medium described above can update one or more parameters associated with a neural network system based on one or more losses associated with a third 3D mesh of the target in a real-world reference frame; and determine, by the neural network system using the updated one or more parameters, the second 3D mesh parameters for the second 3D mesh of the target.

In some aspects, the method, apparatuses, and computer-readable medium described above can determine the third 3D mesh of the target based on a non-parametric mesh of the target, a parametric mesh of the target, rotation parameters, translation parameters, image features and/or metadata features.

In some aspects, the method, apparatuses, and computer-readable medium described above can determine, based on an additional image of the target and additional metadata, the image features and the metadata features; determine, based on the image features and the metadata features, the non-parametric mesh of the target and mesh parameters associated with the target; and determine, based on pose parameters and shape parameters associated with the target, the parametric mesh of the target.

In some examples, the mesh parameters can include pose parameters, shape parameters, rotation parameters, and/or translation parameters. In some cases, the parametric mesh, the non-parametric mesh and the mesh parameters correspond to a particular reference frame of a device that captured the additional image. In some examples, the one or more losses can include a loss of the third 3D mesh, a loss of 3D keypoints in the third 3D mesh, a pose and shape regularization loss, and/or a loss of two-dimensional (2D) keypoint projections from the third 3D mesh and/or the 3D keypoints. In some cases, the metadata features can include intrinsic parameters associated with a device that captured the additional image. In some examples, the intrinsic parameters can include a focal length of the device, an optical center of the device, a skew of the device, a size of the additional image, a lens distortion associated with the device, and/or a particular reference frame of the device.

In some aspects, the method, apparatuses, and computer-readable medium described above can train the neural network system using the non-parametric mesh of the target and the parametric mesh of the target.

In some aspects, the method, apparatuses, and computer-readable medium described above can generate the second 3D mesh of the target based on the second 3D mesh parameters, wherein the second 3D mesh is in the 3D coordinate system of the real-world scene.

In some examples, the second 3D mesh can include a skinned mesh model and/or a parametric mesh model. In some cases, the target can include an articulated object.

In some cases, determining the second 3D mesh parameters can include transforming one or more of the first 3D mesh parameters from the first reference frame to the second reference frame.

In some examples, the second 3D mesh can include determining a rotation and translation of the first 3D mesh from the first reference frame to the second reference frame.

In some examples, the second 3D mesh can include identifying 3D keypoints associated with the first 3D mesh of the target and, based on the image and the metadata, determining locations and orientations of the 3D keypoints in the 3D coordinate system of the real-world scene.

In some examples, the first 3D mesh parameters can include pose parameters, shape parameters, translation parameters, location parameters, and/or visibility parameters. In some cases, the visibility parameters can indicate an estimated visibility of one or more points in the first 3D mesh and/or an estimated occlusion of the one or more points in the first 3D mesh.

In some examples, the metadata can include intrinsic parameters associated with the image capture device. In some cases, the intrinsic parameters can include a focal length of the image capture device, an optical center of the image capture device, a skew of the image capture device, a size of the image, a lens distortion associated with the image capture device, and/or a respective reference frame of the image capture device. In some examples, the respective reference frame can be the first reference frame.

In some cases, the image can include a cropped monocular image. In some cases, the metadata can include a location of a bounding box around the target in the cropped monocular image.

In some aspects, the method, apparatuses, and computer-readable medium described above can determine image features in the image of the target; determine metadata features and image features based the image and the metadata; and determine the first 3D mesh parameters based on a combination of the metadata features and the image features. In some examples, the first 3D mesh parameters can include pose parameters, shape parameters, translation parameters, location parameters, and/or visibility parameters. In some cases, the visibility parameters can indicate an estimated visibility of one or more points in the first 3D mesh and/or an estimated occlusion of the one or more points in the first 3D mesh.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
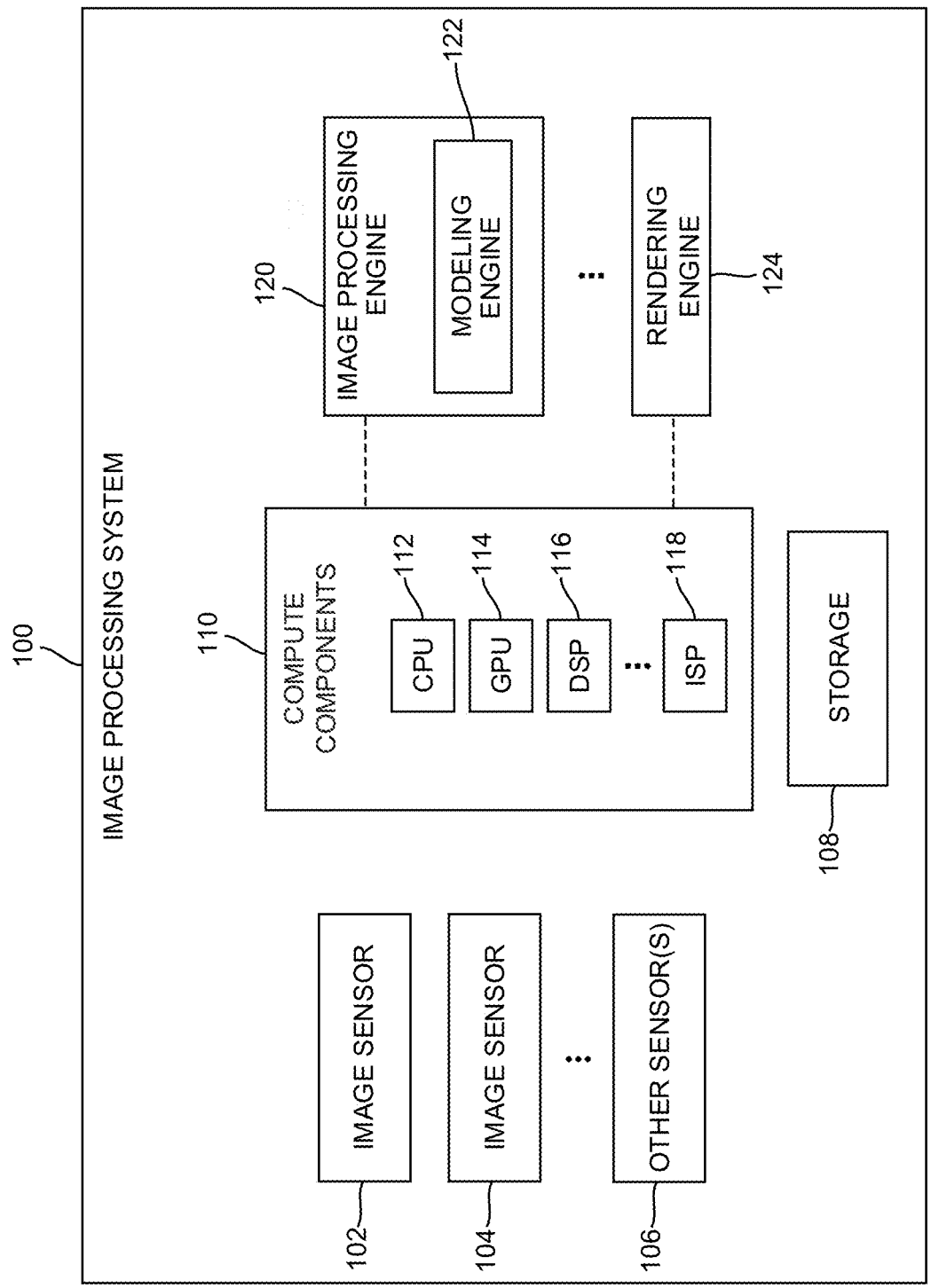
FIG. 1 is a simplified block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, three-dimensional (3D) models can be constructed for objects captured in images. The 3D models can be used in a variety of applications such as, for example, multimedia (e.g., movies, video games, extended reality, etc.), computer vision (e.g., motion tracking, shape modeling, object mapping, image recognition, pose estimation, image registration and warping, scene reconstruction, image segmentation, animation, etc.), robotics and automation, vehicle systems (e.g., autonomous vehicles), aviation systems, industrial design, health care, among others. 3D modeling can be challenging and complex, particularly when modeling articulated objects. Moreover, 3D modeling technologies are often inefficient, inaccurate and inconsistent, and have difficulty dealing with noise, ambiguities, and configuration changes, among other things.

In some examples, deep learning or other approaches may be implemented to model and/or otherwise understand articulated objects and/or other objects. However, the deep learning and other approaches may not provide a full 3D mesh of the object and generally model the object in a root-relative frame as opposed to a real-world frame. In some cases, motion capture techniques can be implemented for object pose estimation. However, such motion capture techniques can be expensive and difficult to implement, particularly in unconstrained environments.

In some cases, stereo algorithms can be used to calculate depth information for objects captured in images. The depth information can be used to model the objects in the images. However, stereo algorithms generally depend on effective two-dimensional (2D) feature matching and involve significant manual tuning of thresholds for feature matching. In addition, with stereo algorithms, it is difficult to preserve epipolar constraints when camera lenses have inherent radial distortion.

Deep learning algorithms can be used to calculate depth information and model objects in images. However, the deep learning algorithms can be inflexible and often require significant training and retraining. For example, deep learning algorithms are generally constrained by the stereo geometry on which they are trained and can fail when image capture devices are assembled with a different geometry for other use cases. In such scenarios, the deep learning algorithms may need to be retrained for the specific stereo geometry being implemented.

As previously noted, modeling approaches generally model objects from a root-relative frame as opposed to a real-world frame. By modeling the objects from a root-relative frame as opposed to a real-world frame, the potential use and accuracy of such generated models can be limited in various applications, including applications involving interactions with objects and/or spaces in the real-world/physical scene. Such modeling approaches also fail to account for spatial relationships within the real-world/physical scene.

In some aspects, systems, apparatuses, processes (also referred to as methods), and computer-readable media (collectively referred to herein as "systems and techniques") are described herein for accurately and efficiently modeling a 3D target (e.g., an object, human, part, structure, etc.) in an image as a 3D mesh. The systems and techniques described herein can model the 3D target in a real-world coordinate system (e.g., a 3D coordinate system with coordinates in the vertical, horizontal, and depth dimensions of a physical scene) corresponding to a scene where the 3D target is located. In some cases, the systems and techniques can model the 3D target from a monocular image captured by an image capture device. According to some examples, the systems and techniques can use a monocular image of an articulated object to model the articulated object. In some examples, the articulated object can be modeled as a skinned mesh, as further described herein. Moreover, the systems and techniques described herein can generate a 3D mesh of an object in 3D coordinates of a real-world scene where the object is located. For example, the systems and techniques can transform mesh parameters from a reference frame (e.g., a camera frame) to a real-world frame (e.g., a real-world coordinate system) and generate a 3D mesh of the object in 3D coordinates of the real-world frame.

In some cases, the 3D modeling systems and techniques described herein can allow flexible depth estimation and 3D modeling from a monocular image (and/or any other images and/or combination of images). In some aspects, the systems and techniques can use camera calibration information and/or other metadata to estimate a 3D real-world coordinate system and/or model a target in the 3D real-world coordinate system. The systems and techniques can, in some cases, learn camera calibrations used to model targets. The 3D modeling systems and techniques are flexible and can be implemented with image capture devices having different parameters, capabilities, and/or spatial information. The 3D modeling systems and techniques described herein can provide accurate and efficient results without additional training or retraining for different image capture devices and/or upon changes in spatial geometries.

Examples of the systems and techniques described herein for 3D modeling are illustrated in FIG. 1 through FIG. 7 and described below. FIG. 1 is a diagram illustrating an example image processing system 100. The image processing system 100 can perform 3D modeling, as further described herein. Moreover, the image processing system 100 can perform various image processing tasks, effects, computations, etc., such as, for example, chroma keying effects, extended reality effects, image registration and warping, motion tracking, pose estimation, object mapping, feature extraction, image recognition (e.g., face recognition, object recognition, etc.), object detection (e.g., expression detection, gender detection, eye gaze detection, age estimation, race estimation, etc.), depth estimation, 3D mesh parameter refinement and fitting, parametric optimization, automation, machine vision, object modeling and registration, and/or any other image processing tasks, effects, and/or computations.

In some illustrative examples, the image processing system 100 can generate skinned meshes using a monocular image input. In some examples, the image processing system 100 can infer the 3D shape and pose of an object represented by the skinned mesh model from a monocular image capturing the object in a scene. In some cases, the image processing system 100 can determine the real-world coordinates of the object (e.g., the coordinates of the object within a real-world/physical scene or environment) from a monocular image capturing the object. In some examples, the image processing system 100 can determine real-world depth information about the object (e.g., depth information of the object within a real-world/physical scene or environment) from a monocular image input and/or estimate a real-world coordinate frame (e.g., a coordinate system of a real-world/physical scene or environment) from the monocular image input. In some cases, the image processing system 100 can use the depth information and/or real-world coordinate frame to derive a mesh for the object in a real-world coordinate frame. In some examples, the generated meshes can be implemented for a variety of applications. For example, the generated meshes can be implemented in applications involving interactions with other objects and/or spaces within a scene, such as extended reality (e.g., virtual reality, augmented reality, etc.) applications, robotics and automation, among others.

The modeled objects can include any target such as, for example, a body part, a body, a tool, a device, a structure, etc. In some examples, the modeled objects can include articulated objects. An articulated object can include at least two components with up to six degrees of freedom between any of them. For example, an articulated object, an articulated object can include a collection of rigid 3D structures constrained by a fixed kinematic tree where a parent-child relationship(s) guides a motion of that object. To illustrate, an articulated object can include a structure with one or more joints or articulations (or articular surfaces) that allow one or more components (e.g., parts, portions, sub-structures, bones, etc.) of the structure to move relative to a different component(s) of the structure and/or provide a certain freedom of movement (e.g., rotational, translational, etc.) between any components of the structure. Non-limiting examples of articulated objects can include a body (e.g., a human body, certain animal bodies, etc.), a body part (e.g., a hand, a head, a leg, a foot, etc.), manipulation robots, certain tools, etc.

In some examples, the modeled objects can be modeled using a skinned model. A skinned model can include a model of articulated objects, where vertices of a surface mesh are connected to several skeleton (e.g., structure, frame, bone, etc.) positions and provide a soft, non-rigid and/or flexible deformation of the surface mesh (e.g., including rigid and non-rigid parts). In some examples, the image processing system 100 can combine benefits of parametric and non-parametric mesh models. For example, in some cases, the image processing system 100 can use non-parametric mesh models during training (in addition to or instead of parametric mesh models) and parametric mesh models at an inference stage. A non-parametric mesh can include a mesh where all the vertices and faces in the mesh are known. A parametric mesh can include a mesh defined by a subset of parameters. In some examples, a parametric mesh can include a 3D structure constrained by a fixed set of parameters that control the pose, location and shape of surface vertices of a modeled object. Non-limiting examples of 3D structures constrained by a fixed set of parameters that control the pose, location, and shape of surface vertices can include objects of uniform shapes such as cylinders, spheres, cuboids, as well as complex shapes and/or structures such as bodies (e.g., a human body, an animal body, etc.), body parts (e.g., a hand, etc.), a manipulator robot, etc.

As further described herein, the use of non-parametric mesh models can help increase the accuracy and results of meshes generated by the image processing system 100, and the use of parametric mesh models at inference time can increase the modeling efficiency, increase flexibility and scalability, reduce the size of representation of 3D mesh models, reduce latency, reduce power/resource use/requirements at the device (e.g., the image processing system 100), etc. In some examples, the image processing system 100 can use non-parameterized mesh models to learn a better fitting capacity and/or performance, and can learn output parameters to drive the modeling of the mesh. The image processing system 100 can efficiently and accurately use parameterized mesh models at inference time, and can regress model parameters using one or more neural networks.

In some examples, the image processing system 100 can use parameters from the image capture device (e.g., image sensor 102 or image sensor 104), such as device calibration parameters, distortion parameters, lens parameters, rotation and translation parameters, etc., and/or other metadata (e.g., input image size, cropped size of input image, size of image area corresponding to captured object, location of object within the input image, radial distortion, lens distortion, etc.) to learn and/or estimate real-world 3D coordinates of the object captured by the image and/or transform mesh parameters from a reference frame to a real-world frame. In some examples, the modeling approaches can be generalized to different image capture devices and/or lenses. For example, calibration inputs and/or losses can allow the image processing system 100 (and/or a neural network implemented by the image processing system 100) to determine and/or ascertain specific image capture device lens configurations. The image processing system 100 can provide distortion aware scaling. For example, the image processing system 100 can use information about the size of an area, such as a bounding box, of a cropped image object and the location of the cropped image object to learn and/or model the radial distortion and/or the scaling of the cropped image object.

In the example shown in FIG. 1, the image processing system 100 includes image sensor 102, storage 108, computing components 110, an image processing engine 120, a modeling engine 122, and a rendering engine 124. The image processing system 100 can also optionally include one or more additional image sensors 104 and/or other sensors 106, such as a radar sensor, a light detection and ranging (LIDAR) sensor, an infrared (IR) sensor, a gyroscope, an accelerometer, an inertial measuring unit (IMU), an audio sensor, etc.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, an Internet-of-Things (IoT) device, or any other suitable electronic device(s).

In some implementations, the image sensor 102, the image sensor 104, the other sensor 106, the storage 108, the computing components 110, the image processing engine 120, the modeling engine 122, and/or the rendering engine 124 can be part of the same computing device. For example, in some cases, the image sensor 102, the image sensor 104, the other sensor 106, the storage 108, the computing components 110, the image processing engine 120, the modeling engine 122, and the rendering engine 124 can be integrated into a smartphone, laptop, tablet computer, smart wearable device, gaming system, server, and/or any other computing device. In other implementations, any of the image sensor 102, the image sensor 104, the other sensor 106, the storage 108, the computing components 110, the image processing engine 120, the modeling engine 122, and/or the rendering engine 124 can be part of two or more separate computing devices.

The image sensor 102 and the image sensor 104 can include an image sensor and/or image capture device capable of capturing images. For example, the image sensor 102 and the image sensor 104 can include a sensor capable of capturing red-green-blue (RGB) images. In some examples, an image (or frame) can include a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

In some cases, the image sensor 102 and/or the image sensor 104 can include or can be part of monocular image capture devices, such as monocular cameras. In some examples, the image sensor 102 and/or the image sensor 104 can capture monocular images. The image processing system 100 can use monocular images captured by the image sensor 102 and/or the image sensor 104 as inputs for 3D modeling as further described herein.

In some cases, the image sensor 102 and/or the image sensor 104 can be any type of image sensor (or image capture device) and/or video sensor (or video capture device). For instance, the image sensor 102 and/or the image sensor 104 can include a digital camera sensor, video camera sensor, smartphone camera sensor, image/video capture device included as part of an electronic apparatus (e.g., a television, a computer, a camera, etc.), etc. In some cases, the image sensor 102 and/or the image sensor 104 can be part of a camera or computing device, such as a digital camera, a video camera, an IP camera, a smartphone, a smart television, a game system, a scanner, a multi-camera system, or other computing device. For example, the image sensor 102 and the image sensor 104 can be part of a dual-camera system or device, such as a smartphone, a camera, etc. The image sensor 102 and the image sensor 104 can capture image data and/or video content (e.g., raw image and/or video data). The image data and/or video content can be processed by the computing components 110, the image processing engine 120, the modeling engine 122, and/or the rendering engine 124 as described herein.

The other sensor(s) 106 can be any sensor for detecting and measuring information such as distance, motion, position, depth, speed, etc. Non-limiting examples of other sensors include LIDARs, gyroscopes, accelerometers, magnetometers, IR sensors, inertial measurement units (IMUs), radar sensors, machine vision sensors, etc. In some cases, the image processing system 100 can include other sensors, such as a smart scene sensor, a speech recognition sensor, an impact sensor, a position sensor, a tilt sensor, a light sensor, etc.

The storage 108 can be any storage device(s) for storing data, such as image or video data for example. Moreover, the storage 108 can store data from any of the components of the image processing system 100. For example, the storage 108 can store data or measurements from the image sensor 102, the image sensor 104, the other sensor 106, the computing components 110 (e.g., parameters, outputs, generated images, calculation results, models, etc.), and/or data from any of the image processing engine 120, the modeling engine 122, and/or the rendering engine 124 (e.g., output images, processing results, models, etc.). In some examples, the storage 108 can include a buffer for storing data (e.g., image data) for processing by the computing components 110.

In some implementations, the computing components 110 can include a central processing unit (CPU) 112, a graphics processing unit (GPU) 114, a digital signal processor (DSP) 116, and/or an image signal processor (ISP) 118. The computing components 110 can perform various operations such as 3D modeling, image enhancement, object or image segmentation, computer vision, graphics rendering, extended reality (e.g., virtual reality, augmented reality, etc.), image/video processing, sensor processing, recognition (e.g., text recognition, object recognition, feature recognition, face recognition, scene change recognition, etc.), object detection (e.g., shape detection, facial expression detection, eye gaze detection, age detection, gender detection, race detection, pattern detection, etc.), disparity detection, machine learning, depth estimation, filtering, mesh parameter refinement and fitting, and any of the various operations described herein. In some examples, the computing components 110 can implement the image processing engine 120, the modeling engine 122, and the rendering engine 124. In other examples, the computing components 110 can also implement one or more other processing engines.

The operations for the image processing engine 120, the modeling engine 122, and the rendering engine 124 can be implemented by one or more of the computing components 110. In one illustrative example, the image processing engine 120 and the modeling engine 122 (and associated operations) can be implemented by the CPU 112, the DSP 116, and/or the ISP 118, and the rendering engine 124 (and associated operations) can be implemented by the GPU 114. In some cases, the computing components 110 can include other electronic circuits or hardware, computer software, firmware, or any combination thereof, to perform any of the various operations described herein.

In some cases, the computing components 110 can receive data (e.g., image data, etc.) captured by the image sensor 102 and/or image sensor 104, and model an object captured in the data from the image sensor 102 and/or the image sensor 104. In some examples, the image processing system 100 can receive device data from the image sensor 102 and/or the image sensor 104, such as camera calibration data, rotation and translation parameters, lens data, and/or any other data and/or device intrinsics. The image processing system 100 can use the data to generate a 3D mesh model in a real-world reference frame.

The computing components 110 can implement the image processing engine 120 and/or the modeling engine 122 to perform various image processing operations, such as 3D modeling, model optimization and fitting, object tracking, pose estimation, depth estimation, XR rendering, computer vision, transformations, etc. For example, the computing components 110 can implement the image processing engine 120 and/or the modeling engine 122 to perform the 3D modeling techniques described herein. The computing components 110 can process image data captured by the image sensor 102 and/or the image sensor 104 (and/or any other image sensors), image data stored in the storage 108, image data received from a remote source (e.g., a remote camera, a server, a content provider, any combination thereof, and/or other remote source), image data obtained from a combination of sources, any combination thereof, and/or other image data.

In some examples, the modeling engine 122 can be part of or implemented by the image processing engine 120. In other examples, the modeling engine 122 can be separate from (e.g., not part of or implemented by) the image processing engine 120. In some cases, the modeling engine 122 can include (e.g., can implement, can contain, can generate etc.) one or more neural networks and/or models. For example, in some cases, the modeling engine 122 can include and/or implement one or more neural networks and/or skinning models. An illustrative example of a skinning model includes a hand model with articulated and non-rigid deformations or MANO model, as described in Javier Romero et al., "Embodied Hands: Modeling and Capturing Hands and Bodies Together", ACM Transactions on Graphics, Vol. 36, No. 6, Article 245 (November 2017), which is hereby incorporated by reference in its entirety and for all purposes. In some examples, the modeling engine 122 can generate skinned models and meshes, as further described herein. In some examples, the modeling engine 122 can implement any other models, such as any type of statistical models, neural network models, etc.

In some cases, the modeling engine 122 can include and/or implement a neural network system, a transformation system, an optimizer, and/or one or more models, as described herein. For example, the modeling engine 122 can implement any of the neural networks and models shown in FIGS. 2 through 5B and discussed herein.

In some examples, the rendering engine 124 can receive output image data from the computing components 110 and render the output image data for presentation on a display device such as, for example, a screen/display, a television, a projector, etc. In some examples, the rendering engine 124 can receive generated images and/or mesh models from the image processing engine 120 and/or the modeling engine 122 and render the images and/or mesh models.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 7.

As previously noted, the image processing system 100 can estimate real-world coordinates (e.g., location and depth information) of an object captured in an image (e.g., a monocular image and/or any other image) and/or a scene where the object is located. The image processing system 100 can use the image and metadata to estimate the real-world coordinates for the object. The image processing system 100 can use the real-world coordinates to generate a 3D mesh model of the object in a real-world frame (e.g., a frame or coordinate system of a physical scene/environment). In some examples, the image processing system 100 can calculate losses and use the losses to penalize for errors in an estimated 3D mesh and/or keypoint locations, estimated lengths of 3D parts (e.g., bone lengths, structure lengths, etc.), estimated orientations of 3D parts (e.g., bone orientations, structure orientations, etc.), two-dimensional (2D) projections of an estimated 3D mesh and/or 3D keypoints, pose and shape regularization, etc. In some examples, the image processing system 100 can implement an end-to-end trainable modeling system to generate 3D models in a real-world frame. In some cases, the image processing system 100 can implement a multi-phased modeling algorithm. For example, the image processing system 100 can implement an algorithm that includes a training phase and an inference phase.

In some examples, in a training phase, a neural network(s) can be trained with losses to estimate mesh parameters. For example, given an input monocular image capturing a cropped object, the neural network(s) can be trained using camera calibration data, object crop size data, crop location information, a target 3D mesh and/or corresponding 3D mesh ground truth, radial distortion information, and/or any other data. In some examples, the neural network(s) can be trained using parametric and non-parametric mesh models/parameters. In some cases, the neural network(s) can regress mesh parameters and a full non-parameterized mesh graph.

Figure 2:
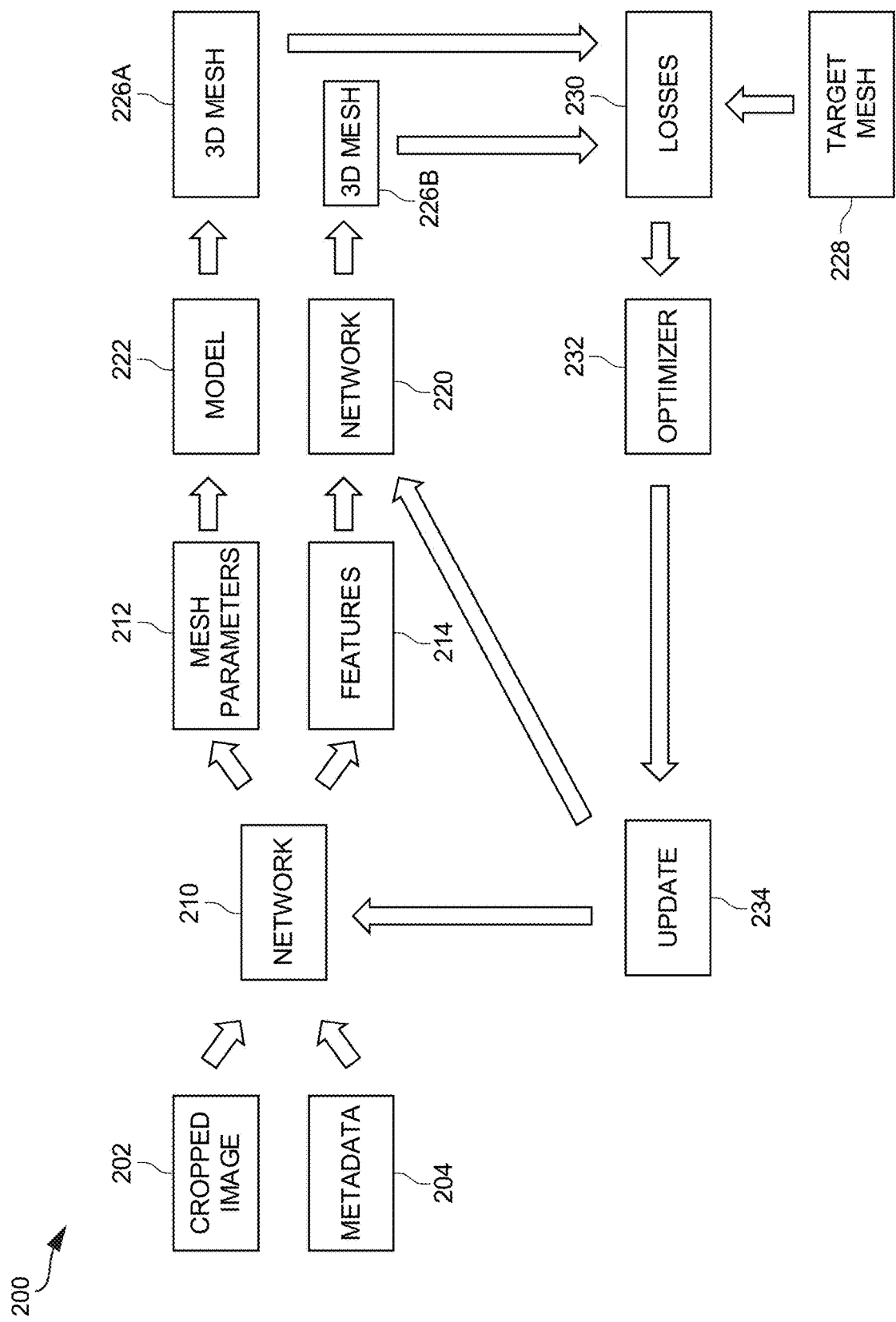
FIG. 2 is a diagram illustrating an example training framework for training a modeling system to estimate real-world coordinates associated with an input image and use the real-world coordinates to generate a three-dimensional (3D) model of an object captured by the input image, in accordance with some examples of the present disclosure.

FIG. 2 is a diagram illustrating an example training framework 200 for training a modeling system to estimate real-world coordinates associated with an input image and use the real-world coordinates to generate a 3D model of an object captured by the input image. In some examples, the training framework 200 and modeling system can be implemented by the image processing system 100 shown in FIG. 1. In some examples, the training framework 200 can be implemented during a training phase of the modeling system. The trained modeling system can generate 3D models at an inference phase, as further described below. The 3D models can be generated in or relative to real-world coordinates in a scene and/or environment. In some examples, the real-world coordinates can correspond to a scene captured by the input image and/or where the object is located.

In FIG. 2, a network 210 can receive a cropped image 202 and metadata 204, and use the cropped image 202 and the metadata 204 to generate mesh parameters 212 and features 214 for modeling an object in the cropped image 202. In other examples, the network 210 can instead receive the metadata 204 and an uncropped image for use in modeling an object in the uncropped according to the techniques described herein.

In some cases, the cropped image 202 can include a monocular image captured by an image capture device (e.g., image sensor 102 or image sensor 104). The monocular image can be cropped to include an object captured by the image and remove other parts/portions of the image and/or adjust a size of the object in the image relative to other parts/portions of the image. In some examples, the network 210 can determine an area and/or bounding box containing an object captured in the cropped image 202. For example, the network 210 can determine a bounding box containing the object captured in the cropped image 202 and the shape, size, and/or location of the bounding box containing the object.

The metadata 204 can include intrinsic parameters and/or calibration information associated with the image capture device (e.g., image sensor 102 or image sensor 104) such as, for example, focal length information, image sensor format information, mappings and/or relationships between device coordinates and image coordinates and/or between coordinates in 3D space and coordinates in a 2D image, etc. In some examples, the metadata 204 can also include other information such as, for example, radial distortion information, image crop size, the size and/or location of the object captured in the cropped image 202 (and/or a bounding box containing the object captured in the cropped image 202), image scaling information, feature and/or keypoint visibility and/or occlusion information, lens distortion information, and/or any other metadata.

The network 210 can include one or more neural networks. In some examples, the network 210 can include a convolutional neural network (CNN) encoder model. In some examples, the network 210 can include a residual neural network. In other examples, the network 210 can include any other neural network and/or neural network architecture.

The mesh parameters 212 can include 3D mesh parameters generated by the network 210 for an object captured in the cropped image 202. The 3D mesh parameters can include, for example, rotation parameters of a 3D mesh/3D keypoints, translation parameters of the 3D mesh/3D keypoints, texture parameters of the 3D mesh/3D keypoints (e.g., parameters describing a texture of the object such as a texture of a skin or surface of the object), pose and shape parameters of the object, 3D coordinates of the 3D keypoints, and/or any other mesh parameters. In some examples, the mesh parameters 212 can correspond to and/or can be relative to a reference frame of the image capture device (e.g., a perspective and/or coordinate system of the image capture device) and/or a real-world frame.

In some examples, the features 214 can include feature embeddings. The feature embeddings can include low-dimensional, learned vector representations of discrete variables and/or features associated with the cropped image 202 and/or the metadata 204. In some examples, the features 214 can include extracted metadata features and image features. In some cases, the features 214 can include a projection (e.g., a 2D or 3D projection) of estimated 3D keypoints and/or mesh parameters, and can embed one or more portions of the metadata 204, such as image capture device calibration information or intrinsics in the metadata 204. In some examples, the features 214 can map extracted features (e.g., object features, keypoints, keypoint locations, keypoint visibility and/or occlusion information, etc.) to a reference coordinate system of the image capture device (e.g., a reference frame of the image capture device) and/or a real-world coordinate system (e.g., coordinates in a real-world/physical scene or environment).

A model 222 can process the mesh parameters 212 to generate a 3D mesh 226A of the object captured in the cropped image 202. The model 222 can include one or more neural network models. In some examples, the model 222 can include a skinning model, such as a MANO model. In some cases, the 3D mesh 226A can include a parametric mesh model. In some examples, the 3D mesh 226A can include a mesh model in a real-world frame associated with a scene containing the object (e.g., a physical environment in which the object is located). In other cases, the 3D mesh 226A can include a mesh model in and/or relative to a reference frame of the image capture device.

In some cases, the model 222 can estimate depth information for a real-world frame and perform a coordinate transformation to determine real-world 3D coordinates. In some examples, the model 222 can estimate parameters (e.g., 3D locations, rotations, translations, etc.) of the 3D mesh 226A in the real-world frame.

A network 220 can process the features 214 to generate a 3D mesh 226B of the object captured in the cropped image 202. In some cases, the network 220 can include one or more neural networks. For example, the network 220 can include a decoder CNN model. In some cases, the 3D mesh 226B can include a non-parametric mesh model. In some examples, the 3D mesh 226B can include a mesh model in a real-world frame associated with a scene containing the object (e.g., a physical environment in which the object is located). In other examples, the 3D mesh 226B can include a mesh model in and/or relative to a reference frame of the image capture device.

In some cases, the network 220 can estimate depth information for a real-world frame and perform a coordinate transformation to determine real-world 3D coordinates. In some examples, the network 220 can predict the 3D mesh 226B in the real-world frame using one or more non-parametric approaches.

The training framework 200 can use a target mesh 228 of the object to calculate losses 230 for the 3D mesh 226A and the 3D mesh 226B. In some examples, the target mesh 228 can represent a desired, accurate, and/or ground-truth 3D mesh model for the object captured in the cropped image 202. In some cases, the target mesh 228 can include a mesh model in a real-world frame from a perspective of the image capture device (e.g., from a reference frame of the image capture device).

In some cases, the losses 230 can be based on distances and/or differences between keypoints and/or parameters in the target mesh 228 and the 3D meshes 226A and 226B. In some examples, the losses 230 can include 3D mesh losses, 3D keypoint losses, and/or 2D keypoint losses (e.g., losses of 2D projections of keypoints and/or features 214). In some cases, the losses 230 can include losses in estimated 3D meshes and/or keypoint locations, estimated 3D part lengths (e.g., bone lengths, structure lengths, etc.), estimated 3D part orientations (e.g., bone orientations, structure orientations, etc.), 2D projections of estimated 3D meshes and/or keypoints, pose and shape regularization, and/or any other losses.

An optimizer 232 can use the losses 230 to generate an update 234 for the network 210 and the network 220. The losses 230 can penalize for errors in estimated 3D meshes and/or keypoint locations, 3D part lengths, 3D part orientations, 2D projections of estimated 3D meshes and/or keypoints, pose and shape regularization, etc. For example, the optimizer 232 can use the losses 230 as feedback to generate an update 234 that adjusts (e.g., optimizes, refines, etc.) network, mesh and/or real-world frame parameters. In some cases, the update 234 can include updated network parameters for the network 210 and the network 220. In some examples, the network 210 and the network 220 can use the updated parameters from the update 234 to better fit 3D models to a real-world frame. In some cases, the network 210 and the network 220 can use the updated parameters in one or more training iterations as described above. The network 210 can use the updated parameters to process the cropped image 202 and the metadata 204 and the network 220 can use the updated parameters to generate another 3D mesh 226B as previously described.

In some cases, the optimizer 232 can use the losses 230 to estimate refined mesh and/or network parameters. The optimizer 232 can be a first or second order optimizer. In some examples, the optimizer 232 can implement an iterative method for solving unconstrained nonlinear optimization problems. For example, the optimizer 232 can implement a Broyden-Fletcher-Goldfarb-Shanno (BFGS) algorithm or a limited-memory BEGS (L-BEGS) algorithm. In other examples, the optimizer 232 can implement any other optimization algorithm.

In some examples, the image processing system 100 can implement the training framework 200 shown in FIG. 2. In some cases, the network 210, the network 220, the network 220, and/or the optimizer 232 can be implemented by the image processing engine 120 and/or the modeling engine 122. In some cases, the image processing system 100 can implement a multi-phased modeling algorithm that includes a training phase and an inference phase. For example, the image processing system 100 can use the training framework 200 to perform one or more training iterations during a training phase as described above. In some examples, image processing system 100 can use the training framework 200 to perform a certain number of training iterations and generate a certain number of updates (e.g., update 234), or continue to perform training iterations and generate updates (e.g., update 234) until one or more of the losses 230 reach a threshold. In some examples, the image processing system 100 can use the trained modeling system to generate 3D mesh models in the inference phase, as further described herein.

Figure 3:
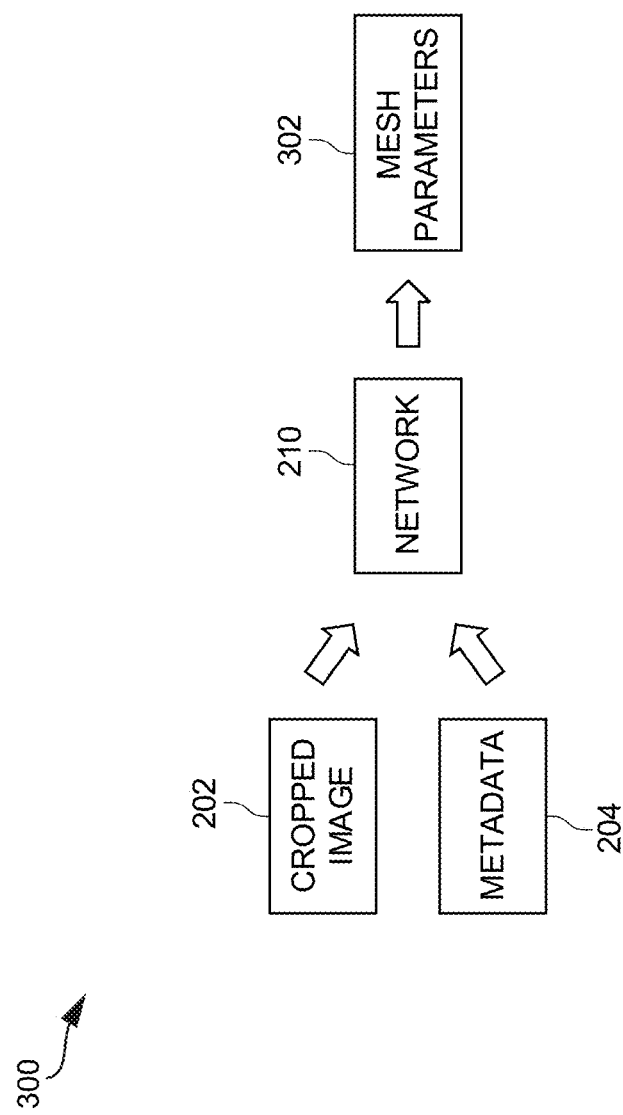
FIG. 3 is a diagram illustrating an example inference phase used to generate mesh parameters for an object in a cropped image, in accordance with some examples of the present disclosure.

FIG. 3 is a diagram illustrating an example inference phase 300 used to generate mesh parameters 302 for the object in the cropped image 202. In some examples, the inference phase 300 can be performed after the modeling system is trained using the training framework 200 shown in FIG. 2. The inference phase 300 can be performed to generate a 3D mesh of an object in a real-world coordinate system/frame.

As shown, the network 210 can process the cropped image 202 and the metadata 204 to generate the mesh parameters 302. The cropped image and/or the metadata can be the same as or different than the cropped image and/or the metadata used by the training framework 200 in FIG. 2. Moreover, the image capture device (e.g., image sensor 102 or image sensor 104) used to capture the cropped image in FIG. 3 and associated with some or all of the metadata in FIG. 3 can be the same or different than the image capture device used to capture the cropped image in FIG. 2 and associated with some or all of the metadata in FIG. 2. For illustration purposes, FIG. 3 shows the network 210 processing the same cropped image (e.g., cropped image 202) and metadata (e.g., metadata 204) as the cropped image and metadata processed by the network 210 during the training phase in FIG. 2.

In some examples, the network 210 can use the metadata 204 to estimate real-world coordinates associated with the cropped image 202 (and/or a scene associated with the cropped image 202) and use the real-world coordinates to generate mesh parameters 302 for a 3D model of an object captured by the cropped image 202. In some examples, the network 210 can use the mesh parameters 302 to output a 3D model generated in the real-world coordinates. In some cases, the 3D model can be generated in the real-world coordinates from a reference frame of the cropped image 202 and/or image capture device. In some cases, the real-world coordinates can correspond to a scene captured by the cropped image 202 and/or where the object is located.

In some cases, the mesh parameters 302 can include parameters used to derive a 3D mesh of the object in the real-world frame. In some examples, the 3D mesh can include a parametric mesh model. In some cases, the parametric mesh model can include a skinned mesh. The mesh parameters 302 can include 3D keypoint locations in the real-world frame, rotation parameters in the real-world frame, translation parameters in the real-world frame, shape and/or texture parameters, pose parameters, and/or any other mesh parameters. In some examples, rotation and translation parameters can include predicted rotations and translations in the real-world frame. The rotations and translations can be predicted from a reference frame associated with the cropped image 202 and/or the image capture device.

Figure 4:
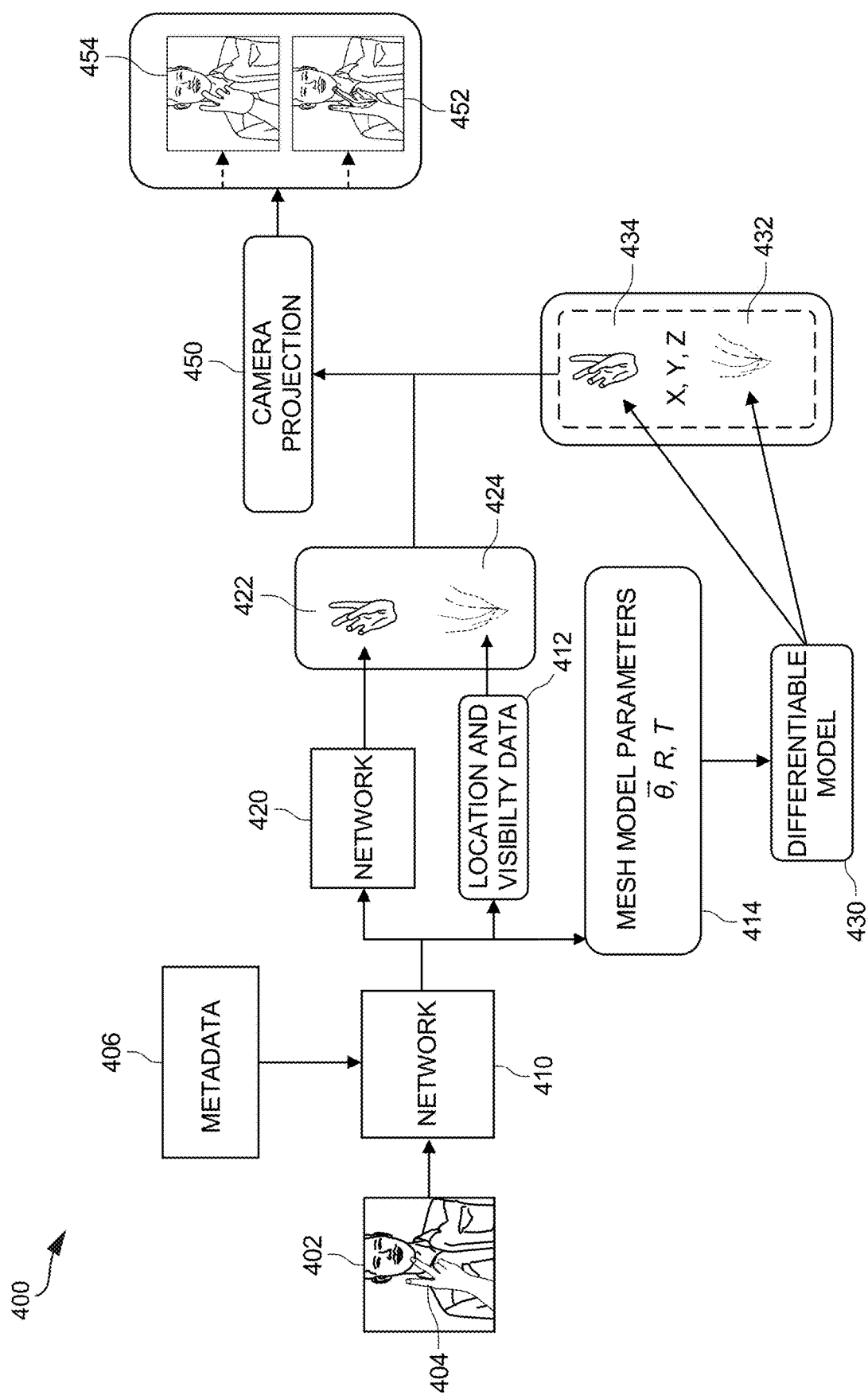
FIG. 4 is a diagram illustrating an example 3D modeling system, in accordance with some examples of the present disclosure.

FIG. 4 is a diagram illustrating an example 3D modeling system 400. The 3D modeling system 400 is shown modeling a hand 404 according to an example use case. The 3D modeling system 400 in this example includes components used during a training phase and components used during an inference phase. For example, during a training phase, the 3D modeling system 400 may use any and/or all of the data and/or components shown in FIG. 4 (as well as other components and/or data not shown in FIG. 4), and during an inference phase, the 3D modeling system 400 may use a subset of the data and components shown in FIG. 4 such as, for example, the cropped image 402, the metadata 406, the neural network 410, the mesh model parameters 414, and/or the differentiable model 430.

In FIG. 4, the network 410 can be the same as or different than the network 210 shown in FIG. 2, the neural network 420 can be the same as or different than the model 222 shown in FIG. 2, and the differentiable model 430 can be the same as or different than the network 220 shown in FIG. 2. Moreover, in some examples, the 3D modeling system 400 can be implemented by the image processing system 100 shown in FIG. 1.

In this example, the cropped image 402 includes/captures the hand 404 being modeled by the 3D modeling system 400. In some examples, the cropped image 402 can be based on a monocular image captured by an image capture device (e.g., image sensor 102 or image sensor 104). The monocular image can be cropped to include the hand 404 and exclude one or more other portions of the monocular image. In some examples, to generate the cropped image 402, the image processing system 100 can detect the hand 404 in the monocular image and crop the monocular image to include the hand 404 at or near a center region of the image. In some examples, the 3D modeling system 400 can model the hand 404 as described herein using an uncropped image capturing the hand 404.

The neural network 410 can use the cropped image 402 and metadata 406 to generate mesh parameters and feature embeddings for deriving a 3D mesh model of the hand 404. The neural network 410 can include a CNN or any other neural network suitable for processing image data as described herein. In some examples, the neural network 410 can include an encoder CNN, such as a ResNet, a MobileNet, and the like. The metadata 406 can include intrinsic parameters (e.g., device or camera intrinsics) associated with the image capture device that captured the image data associated with the cropped image 402. In some cases, the metadata 406 can include additional metadata about the cropped image 402, the hand 404, the image capture device, etc.

The metadata 406 can include the same or different type of information as the metadata 204 in FIG. 2. In some examples, the metadata 406 can include a radial distortion associated with the image capture device (and/or a lens of the image capture device) that captured the image data associated with the cropped image 402, a focal length associated with the image capture device, an optical center associated with the image capture device (and/or a lens of the image capture device), a crop size of the hand 404, a size and/or location of a bounding box containing the hand 404, a scaling ratio of the cropped image 402 (e.g., relative to the hand 404 and/or the uncropped image) and/or the hand 404 (e.g., relative to the cropped image 402 and/or the uncropped image), a distance of a point and/or region of the hand 404 to an optical point and/or region of a lens associated with the image capture device (e.g., a distance of a center of the hand 404 to an optical center of the lens), and/or any other metadata and/or device (e.g., image capture device) calibration information.

During an inference phase, the neural network 410 can generate mesh model parameters 414 for a 3D mesh of the hand 404. A differentiable model 430 can use the mesh model parameters 414 to generate 3D keypoints 432 and a 3D mesh model 434 of the hand 404. In some examples, the differentiable model 430 can include a skinning model, as previously described. In some cases, the differentiable model 430 can implement a forward kinematics algorithm. In some examples, the differentiable model 430 can be based on a fixed hand kinematic tree that incorporates child-parent relationships among different joint and bone locations of the hand 404.

In some examples, the mesh model parameters 414 can include shape parameters, pose parameters, mesh rotation parameters, mesh translation parameters, and/or 3D keypoint locations transformed from a frame of the image capture device to a real-world frame. In some cases, the mesh model parameters 414 can include rotation and translation parameters predicted for a real-world frame from a frame of the image capture device. In some examples, the shape parameters can indicate the length of different bones of the hand 404 in 3D space. The shape parameters can also indicate other shape information about the hand 404 (and/or bones of the hand 404), such as a dimension (e.g., size, width, etc.) of the hand 404 and/or bones of the hand 404. In some examples, the shape parameters can include and/or represent a parametric, triangulated mesh that includes 3D vertices on a surface of the hand 404.

In some cases, the pose parameters can indicate an orientation of the hand 404 and/or bones of the hand 404. For example, the pose parameters can indicate 3D orientations of bones in the hand 404. In some examples, the pose parameters can include and/or represent a kinematic chain that includes a number of 3D keypoint locations and angles.

During a training phase, the neural network 410 can also generate 3D keypoints and feature embeddings for modeling the hand 404. In some examples, the feature embeddings can be based on the metadata 406 and features extracted from the cropped image 402. In some cases, the 3D keypoints and feature embeddings can include keypoint location and visibility data 412. The keypoint location and visibility data 412 can include 3D keypoint locations (e.g., locations of keypoints along an X (e.g., horizontal) axis, a Y (e.g., vertical) axis, and a Z (e.g., depth) axis) and visibility values indicating how visible (or occluded) the keypoints are. For example, if a joint in the hand 404 is occluded by a finger in the hand 404, the joint can have a visibility value indicating that the joint is occluded, and the finger can have a visibility value indicating that the finger is visible in the image.

A neural network 420 can receive the 3D keypoints and feature embeddings from the neural network 410 and generate a 3D mesh 422 of the hand 404 and 3D keypoints associated with the 3D mesh 422. In some examples, the 3D keypoints 424 can be generated based on the keypoint location and visibility data 412. The neural network 420 can include a CNN or any other architecture suitable for generating the 3D mesh 422 as described herein. In some examples, the neural network 420 can include a graph convolutional decoder network.

The 3D modeling system 400 can use the 3D mesh 422 and 3D keypoints 424 from the neural network 420 and the 3D mesh 434 and 3D keypoints 432 from the differentiable model 430 to generate a projection 450 for/from the image capture device. The projection 450 can include a 2D projection of estimated 3D meshes and keypoints (e.g., 3D mesh 422, 3D keypoints 424, 3D mesh 434 and/or 3D keypoints 432). In some examples, the projection 450 can project the 3D keypoints 424 and/or the 3D keypoints 432 to a 2D space. In some cases, the 3D mesh 422 can include a non-parametric mesh model and the 3D mesh 434 can include a parametric mesh model. The projection 450 can project 3D keypoints (e.g., 3D keypoints 424) of a non-parametric mesh model (e.g., 3D mesh 422) and 3D keypoints (e.g., 3D keypoints 432) of a parametric mesh model (e.g., 3D mesh 434) to a 2D space.

The 3D modeling system 400 can use the projection 450 to generate 3D keypoints 452 in a real-world frame and/or a 3D mesh model 454 in a real-world frame. In some examples, the 3D modeling system 400 can use the projection 450 to calculate losses in the 2D space. The 3D modeling system 400 can use such losses to generate and/or update (e.g., optimize, adjust, etc.) the 3D keypoints 452 in the real-world frame and/or the 3D mesh model 454 in the real-world frame. In some examples, the 3D modeling system 400 can also calculate losses for 3D mesh/keypoint locations, 3D bone lengths, 3D bone orientations, and/or pose and shape regularization, and use such losses to generate and/or update the 3D keypoints 452 and/or the 3D mesh model 454.

Figure 5A:
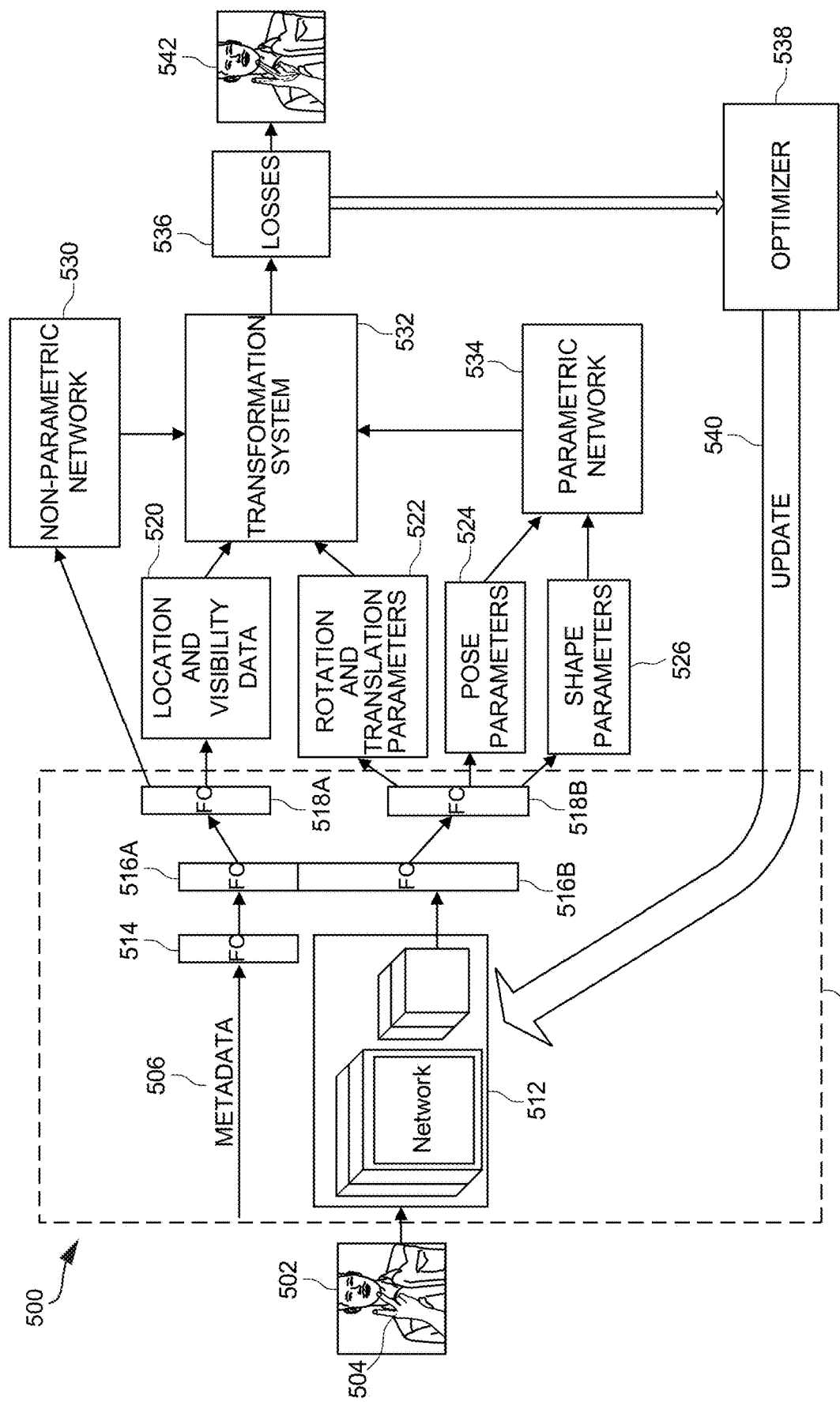
FIG. 5A is a diagram illustrating an example training process for a 3D hand modeling use case, in accordance with some examples of the present disclosure.

FIG. 5A is a diagram illustrating an example training process 500 for a 3D hand modeling use case. The training process 500 can be implemented during a training phase of a 3D modeling system (e.g., 3D modeling system 400) used to model a hand 504 in a cropped image 502.

In this example, the cropped image 502 is processed by a portion 512 of a neural network 510 to generate and/or determine image features, and the metadata 506 is processed by a network layer 514 of the neural network 510 to generate and/or determine metadata features. The metadata features from the network layer 514 and the image features from the portion 512 of the neural network 510 can be concatenated/combined and processed by network layers 516A and 516B. The network layers 516A and 516B can perform a combined neural network forward pass and provide an output to network layers 518A and 518B. In some examples, the network layers 518A and 518B can regress extracted features to determine continues values of mesh parameters.

In some cases, the network layers 514, 516A, 516B, 518A, and 518B can include fully-connected network layers. In some cases, the portion 512 of the neural network 510 can include a backbone of the neural network 510. For example, the portion 512 of the neural network 510 can include a feature extractor or encoder network or network portion (e.g., network layers) of the neural network. The metadata 506 can be the same as or different as the metadata 204 in FIG. 2 and/or the metadata 406 in FIG. 4. In some examples, the metadata 506 can include device (e.g., image capture device) intrinsics and other metadata, as previously described.

For example, the metadata 506 can include a distortion associated with the image capture device (and/or a lens of the image capture device) that captured the image data associated with the cropped image 502, an optical center associated with the image capture device (and/or a lens of the image capture device), a focal length, a crop size of the hand 504 and/or cropped image 502, a size and/or location of the hand 504 (and/or a bounding box containing the hand 504), a scaling ratio of the cropped image 502 (e.g., relative to the hand 504 and/or the uncropped image) and/or the hand 504 (e.g., relative to the cropped image 502 and/or the uncropped image), a distance of a center of the hand 504 to an optical center of the lens, and/or any other metadata and/or device (e.g., image capture device) calibration information.

The network layer 518A can use the output from the network layers 516A and 516B to generate 3D keypoints and feature embeddings 520. In some examples, the 3D keypoints and feature embeddings 520 can include 3D locations (e.g., locations along an X (e.g., horizontal) axis, a Y (e.g., vertical) axis, and a Z (e.g., depth) axis) of keypoints of a mesh of the hand 504 and visibility data corresponding to the keypoints (e.g., visibility values indicating a visibility and/or occlusion of associated keypoints). In some cases, the keypoints in the 3D keypoints and feature embeddings 520 can correspond to points and/or portions of interest in the cropped image 502 and/or nodes of a hand mesh. For example, the keypoints in the 3D keypoints and feature embeddings 520 can indicate 3D locations (e.g., X, Y, Z locations) of joints and bones in the hand 504.

The network layer 518B can use the output from the network layers 516A and 516B to generate rotation and translation parameters 522, pose parameters 524, and shape parameters 526. In some examples, the network layer 518B can generate the rotation and translation parameters 522, the pose parameters 524, and the shape parameters 526 from a reference frame of the image capture device that captured the hand 504 in the cropped image 502 (e.g., from an image capture device frame or coordinate system).

The network layer 518A can output the 3D keypoints and feature embeddings 520 to a transformation system 532 and a non-parametric network 530. In some examples, the non-parametric network 530 can include a CNN, such as a convolutional mesh decoder network. The non-parametric network 530 can use the 3D keypoints and feature embeddings 520 to generate a non-parametric 3D mesh model of the hand 504 and/or 3D keypoints for deriving a non-parametric 3D mesh model of the hand 504. The non-parametric network 530 can provide the non-parametric 3D mesh model of the hand 504 and/or 3D keypoints for the non-parametric 3D mesh model of the hand 504 to the transformation system 532.

The network layer 518B can provide the rotation and translation parameters 522 to the transformation system 532, and the pose parameters 524 and shape parameters 526 to a parametric network 534. The parametric network 534 can include a parametric neural network model. For example, the parametric network 534 can include a parametric mesh decoder network. The parametric network 534 can use the pose parameters 524 and shape parameters 526 to generate a 3D mesh model of the hand 504. The parametric network 534 can then provide the generated 3D mesh model to the transformation system 532.

The transformation system 532 can transform mesh parameters from a device frame (e.g., a frame of the image capture device) to a real-world frame. The transformation system 532 can take into account both non-parametric mesh parameters (e.g., from the non-parametric network 530) and parametric mesh parameters (e.g., from the parametric network 534). For example, the transformation system 532 can transform mesh parameters from the non-parametric 3D mesh model of the hand 504 (and/or 3D keypoints for deriving a non-parametric 3D mesh model of the hand 504) generated by the non-parametric network 530 and the 3D mesh model of the hand 504 generated by the parametric network 534 to a real-world frame. In some cases, the transformation system 532 can predict rotation, translation, and/or location parameters in the real-world frame from mesh parameters in the device frame (e.g., the image capture device frame).

In some examples, the transformation system 532 can use the 3D keypoints and feature embeddings 520, the rotation and translation parameters 522, the non-parametric 3D mesh model of the hand 504 (and/or 3D keypoints for deriving a non-parametric 3D mesh model of the hand 504) from the non-parametric network 530, and the 3D mesh model of the hand 504 from the parametric network 534 to generate mesh parameters for the real-world frame. The mesh parameters for the real-world frame can include a 3D mesh from the real-world frame, 3D keypoints from the real-world frame, 2D projections of the 3D mesh and/or keypoints from the real-world frame, and/or other mesh data parameter predictions for the real-world frame.

In some cases, the transformation system 532 can determine a real-world coordinate frame and generate mesh parameters for the real-world coordinate frame. In some examples, the mesh parameters can include rotations and translations of keypoints in the real-world coordinate frame, 3D locations of the keypoints in the real-world coordinate frame, shape parameters, and/or pose parameters.

The training process 500 can use the output from the transformation system 532 (e.g., mesh parameters in the real-world frame) to determine losses 536 for penalizing the neural network 510 for estimation losses. In some examples, the losses 536 can include losses for estimated 3D mesh parameters and 3D keypoint locations, 3D bone lengths (or other part/structure lengths in other use cases), 3D bone orientations (or other part/structure orientations in other use cases), 2D projections of estimated 3D meshes and keypoints, and/or pose and shape regularization. For example, the losses 536 can include losses calculated for the 3D mesh and 3D keypoints from the non-parametric network 530 and the parametric network 534, and keypoints projected in 2D space from the 3D mesh and 3D keypoints generated by the non-parametric network 530 and/or the parametric network 534.

An optimizer 538 can use the losses 536 to generate an update 540 for the neural network 510. The update 540 can update/adjust parameters used to generate 3D mesh data from the cropped image 502. For example, the update 540 can include network parameters for the neural network 510. The neural network 510 can use the network parameters to generate reduce one or more errors in its output results and/or adjust (e.g., optimize) its output results. In some cases, the training process 500 can repeat based on the update 540 to generate additional losses (e.g., losses 536)

and/or updates (e.g., update 540) to increase an accuracy of the system. In some examples, the training process 500 can repeat for one or more iterations until an output 542 of the training process 500 achieves a desired result and/or the losses for the output 542 are reduced a threshold amount. In some examples, the output 542 can include a 3D mesh and keypoints in the real-world frame. Once the training process 500 is complete (including one or more iterations), the modeling system can be tuned to generate 3D meshes and keypoints for real-world frames. The tuned modeling system can estimate 3D meshes and keypoints during an inference stage, as further described herein.

In the illustrative example shown in FIG. 5A, the neural network 510 can be the same as or different than the network 210 shown in FIG. 2 and/or the network 410 shown in FIG. 4, the non-parametric network 530 can be the same as or different than the model 222 shown in FIG. 2 and/or the neural network 420 shown in FIG. 4, and the parametric network 534 can be the same as or different than the network 220 shown in FIG. 2 and/or the differentiable model 430 shown in FIG. 4. Moreover, in some examples, the training process 500 can be implemented by the image processing system 100 shown in FIG. 1.

Figure 5B:
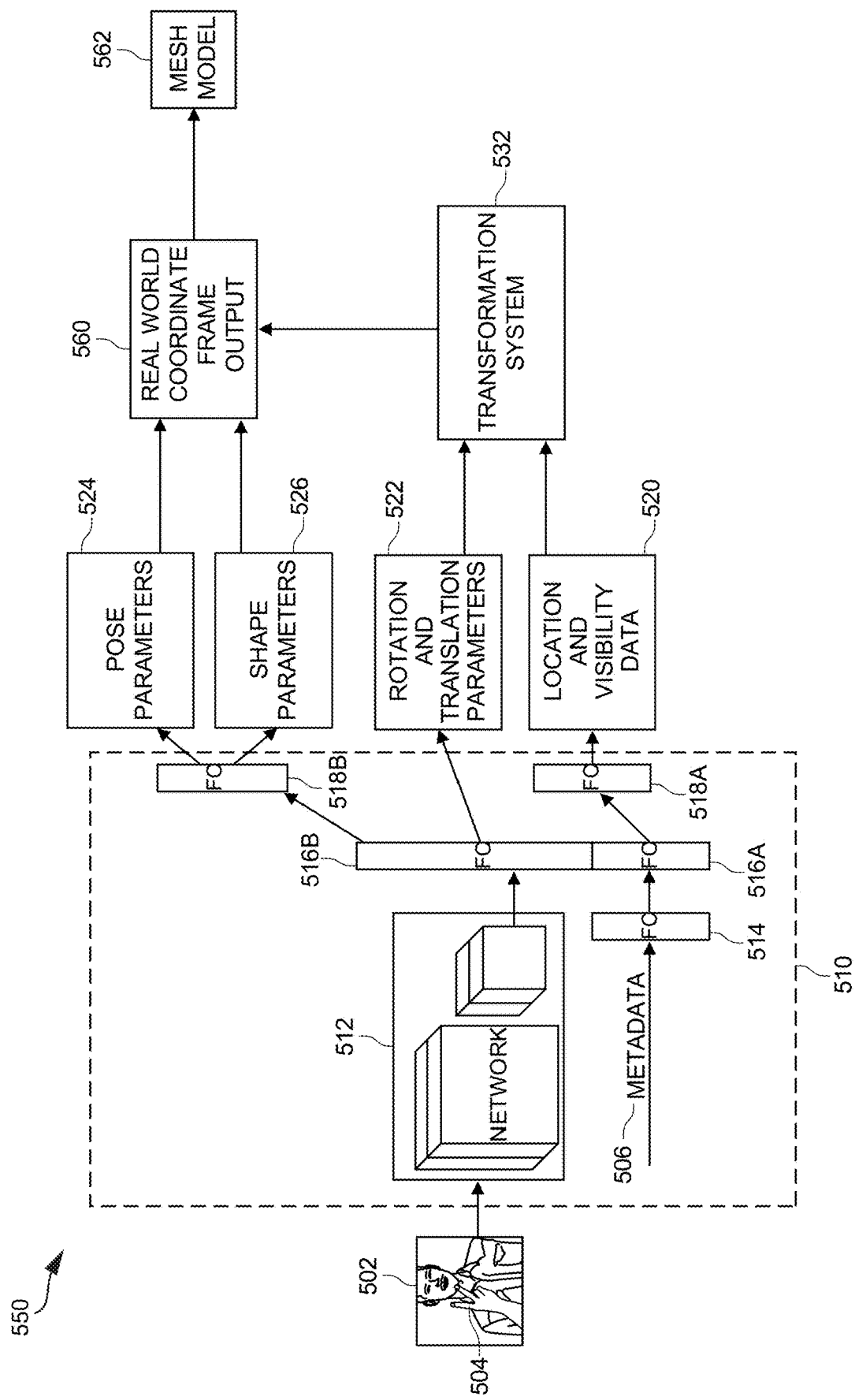
FIG. 5B is a diagram illustrating an example model inference process for estimating a 3D model in a real-world frame, in accordance with some examples of the present disclosure.

FIG. 5B is a diagram illustrating an example model inference process 550 for estimating a 3D model in a real-world frame. The model inference process 550 can be implemented at an inference stage to estimate a 3D mesh of a target (e.g., hand 504) in the cropped image 502 for a real-world frame. In this example, the model inference process 550 is described with respect to a hand modeling use case for modeling the hand 504 in the cropped image 502, and performed after the training process 500 shown in FIG. 5B.

As shown, the neural network 510 can generate the 3D keypoints and feature embeddings 520, the rotation and translation parameters 522, the pose parameters 524, and the shape parameters 526 based on the cropped image 502 and the metadata 506, as previously described with respect to the training process 500 shown in FIG. 5A. The transformation system 532 can transform the 3D keypoints and feature embeddings 520 and the rotation and translation parameters 522 to a real-world frame. In some examples, the transformation system 532 can generate mesh transformation parameters for the real-world frame based on the 3D keypoints and feature embeddings 520 and the rotation and translation parameters 522.

The model inference process 550 can use the output from the transformation system 532 (e.g., the transformed mesh parameters), the pose parameters 524, and the shape parameters 526 to generate a real-world frame output 560. The real-world frame output 560 can include mesh parameters for deriving a mesh model of the hand 504 in a real-world coordinate system. In some examples, the mesh parameters in the real-world frame output 560 can include 3D keypoints in a real-world coordinate system (e.g., keypoints in a real-world horizontal (X) dimension, vertical (Y) dimension, and depth (Z) dimension), predicted rotation and translation parameters, pose parameters, and shape parameters. In some cases, the mesh parameters in the real-world frame output 560 can also include visibility and/or occlusion data, as previously described. In some cases, the real-world frame output 560 can include parametric mesh parameters for generating a 3D mesh model of the hand 504 in the real-world frame.

A model 562 can use the real-world frame output 560 to generate the 3D mesh model of the hand 504 for the real-world frame (e.g., in a 3D coordinate system of the real/physical world/scene). The model 562 can include one or more neural network models. For example, in some cases, the model 562 can include a skinning model, such as the MANO model previously noted. The model 562 can output a 3D mesh model of the hand 504 for the real-world coordinate frame. In some examples, the 3D mesh model can include a parametric mesh transformed from a reference frame of the image capture device to the real-world frame. In some examples, the 3D mesh model of the hand 504 can include a skinned model in the real-world frame.

As previously described, in some cases, the training process 500 can generate non-parametric meshes and parametric meshes, and the model inference process 550 can generate parametric meshes. The use of non-parametric meshes and parametric meshes in the training process 500 can provide higher training results and learning accuracy/performance, among other benefits/advantages from non-parametric and parametric meshes. The use of parametric meshes in the model inference process 550 can allow the modeling system to generate models with lower latency, lower power/resource consumption, higher modeling efficiency, smaller sizes, etc.

For illustration and explanation purposes, the training process 500 and the model inference process 550 in FIGS. 5A and 5B are described with respect to a hand modeling use case. However, in other examples, the training process 500 and model inference process 550 can be implemented for other modeling use cases. For example, the training process 500 and model inference process 550 can be implemented for modeling other targets such as, for example, other objects and/or structures (e.g., robotic objects, tools, autonomous vehicles, articulated structures, etc.), other parts (e.g., a foot, a leg, an arm, a door, etc.), different types of bodies (e.g., animals, humans, etc.), and/or any other targets.

Figure 6:
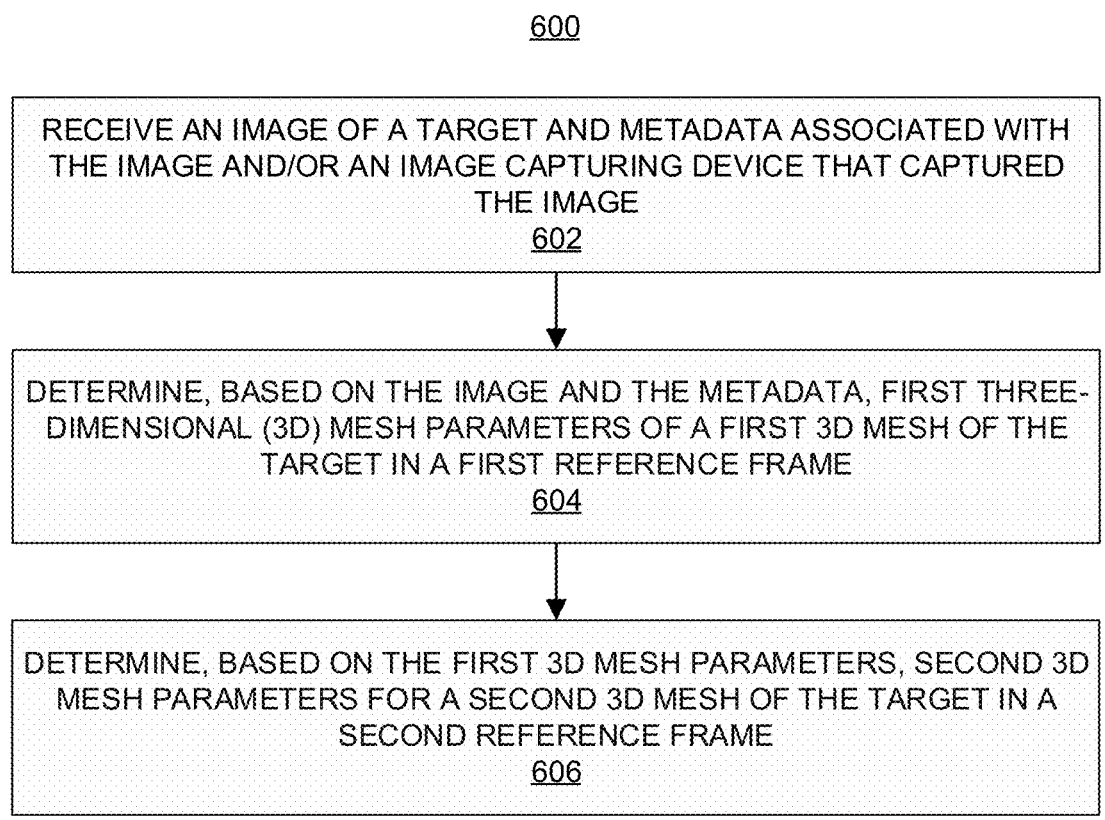
FIG. 6 is a flowchart illustrating an example process for modeling 3D meshes using monocular images, in accordance with some examples of the present disclosure.

FIG. 6 is a flowchart illustrating an example process 600 for modeling 3D objects. At block 602, the process 600 can include receiving an image (e.g., cropped image 202, cropped image 402, cropped image 502) of a target (e.g., hand 404, hand 504) and metadata (e.g., metadata 204, metadata 406, metadata 506). The metadata is associated with the image and/or an image capture device (e.g., image sensor 102, image sensor 104) that captured the image. In some examples, the image can be a monocular image.

In some examples, the metadata can include intrinsic parameters associated with the image capture device. In some cases, the intrinsic parameters can include a focal length of the image capture device, an optical center of the image capture device, a skew of the image capture device, a size of the image, a lens distortion associated with the image capture device, and/or a respective reference frame of the image capture device. The respective reference frame can include the first reference frame. In some cases, the image can include a cropped image, and the metadata can include a location of a bounding box around the target in the cropped image.

In some examples, the target can include an object, such as an articulated object. For example, the target can include a body (e.g., a human body, an animal body, etc.), a body part (e.g., a hand, a head, a leg, etc.), a manipulator robot, a structure (e.g., a door, etc.), a vehicle, or other object.

At block 604, the process 600 can include determining, based on the image and the metadata, first 3D mesh parameters of a first 3D mesh of the target. The first 3D mesh parameters and the first 3D model can correspond to a first reference frame associated with the image and/or the image capture device. In some examples, the first reference frame can be a coordinate reference frame of the image capture device. In some cases, the first 3D mesh parameters can be determined using a neural network system (e.g., network 210, network 410, neural network 510).

In some cases, the first 3D mesh parameters can include pose parameters, shape parameters, rotation parameters, translation parameters, location parameters, and/or visibility parameters. In some examples, the visibility parameters can indicate an estimated visibility of one or more points in the first 3D mesh and/or an estimated occlusion of the one or more points in the first 3D mesh.

At block 606, the process 600 can include determining, based on the first 3D mesh parameters, second 3D mesh parameters (e.g., mesh parameters 302, real-world frame output 560) for a second 3D mesh of the target. The second 3D mesh parameters and the second 3D mesh can correspond to a second reference frame. In some examples, the second reference frame can include a 3D coordinate system of a real-world scene in which the target is located. In some cases, a neural network system (e.g., network 210, network 410, network 510) can infer a rigid transformation to determine a different reference frame (e.g., the second reference frame). In some examples, a neural network system can infer a rigid transformation between the first reference frame and the second reference frame (e.g., between a camera frame and a real-world frame).

In some examples, determining the second 3D mesh parameters can include transforming one or more of the first 3D mesh parameters from the first reference frame to the second reference frame. For example, determining the second 3D mesh parameters can include transforming rotation, translation, location, and/or pose parameters from the first reference frame to the second reference frame. As another example, determining the second 3D mesh parameters can include transforming the first 3D mesh from the first reference frame to the second reference frame. In some cases, determining the second 3D mesh parameters can include determining a rotation and translation of the first 3D mesh from the first reference frame to the second reference frame.

In some cases, determining the second 3D mesh parameters can include identifying 3D keypoints associated with the first 3D mesh of the target and, based on the image and the metadata, determining locations and orientations of the 3D keypoints in a 3D coordinate system of a real-world scene. The 3D coordinate system can include the first reference frame.

In some cases, the process 600 can include generating the second 3D mesh of the target based on the second 3D mesh parameters. The second 3D mesh can model the target in the 3D coordinate system of the real-world scene. In some examples, the second 3D mesh can include a skinned mesh model and/or a parametric mesh model.

In some cases, the process 600 can include determining image features in the image of the target; determining metadata features and image features based the image and the metadata; and determining the first 3D mesh parameters based on a combination of the metadata features and the image features. In some cases, the first 3D mesh parameters can include pose parameters, shape parameters, translation parameters, location parameters, and/or visibility parameters. In some examples, the visibility parameters can indicate an estimated visibility of one or more points in the first 3D mesh and/or an estimated occlusion of the one or more points in the first 3D mesh.

In some cases, the process 600 can include training the neural network system using a non-parametric mesh of an object and a parametric mesh of the object. In some cases, the process 600 can include determining, based on an additional image of the object and additional metadata, image features and metadata features; determining, based on the image features and the metadata features, a non-parametric mesh of the object and mesh parameters associated with the object; determining, based on the pose parameters and the shape parameters, a parametric mesh of the object; determining a third 3D mesh of the object in a real-world reference frame based on the non-parametric mesh, the parametric mesh, the rotation parameters, the translation parameters, the image features and the metadata features. In some examples, the mesh parameters can include pose parameters, shape parameters, rotation parameters, and translation parameters.

In some cases, the process 600 can further include updating one or more parameters associated with the neural network system based on one or more losses associated with the third 3D mesh. In some examples, the parametric mesh, the non-parametric mesh and the mesh parameters correspond to a particular reference frame of a device (e.g., image sensor 102, image sensor 104) that captured the additional image.

In some examples, the one or more losses can include a loss of the third 3D mesh, a loss of 3D keypoints in the third 3D mesh, a pose and shape regularization loss, and/or a loss of two-dimensional (2D) keypoint projections from the third 3D mesh and/or the 3D keypoints. In some examples, the metadata features can include intrinsic parameters associated with a device that captured the additional image. In some cases, the intrinsic parameters can include a focal length of the device, an optical center of the device, a skew of the device, a size of the additional image, a lens distortion associated with the device, and/or the particular reference frame of the device.

In some examples, the process 600 can include updating one or more parameters associated with a neural network system (e.g., network 210, network 410, network 510) based on one or more losses associated with a third 3D mesh of the object in a real-world reference frame, and determining, by the neural network system using the updated one or more parameters, the second 3D mesh parameters for the second 3D mesh of the target. In some cases, the process 600 can include determining the third 3D mesh of the object based on a non-parametric mesh of the object, a parametric mesh of the object, rotation parameters, translation parameters, image features and/or metadata features.

In some examples, the process 600 can include determining, based on an additional image of the object and additional metadata, the image features and the metadata features, determining, based on the image features and the metadata features, the non-parametric mesh of the object and mesh parameters associated with the object, and determining, based on the pose parameters and the shape parameters, the parametric mesh of the object. In some cases, the mesh parameters can include pose parameters, shape parameters, rotation parameters, and/or translation parameters. In some examples, the process 600 can include training the neural network system using the non-parametric mesh of the object and the parametric mesh of the object.

In some examples, the processes described herein (e.g., processes 500, 550, 600, and/or any other process described herein) may be performed by a computing device or apparatus. In one example, the process 600 can be performed by the image processing system 100 of FIG. 1. In another example, the process 600 can be performed by the computing system having the computing device architecture 700 shown in FIG. 7. For instance, a computing device with the computing device architecture 700 shown in FIG. 7 can implement the operations of FIG. 6 and/or the components and/or operations described herein with respect to any of FIGS. 1 through 6.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the processes 500, 550, 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500, 550, 600 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500, 550, 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
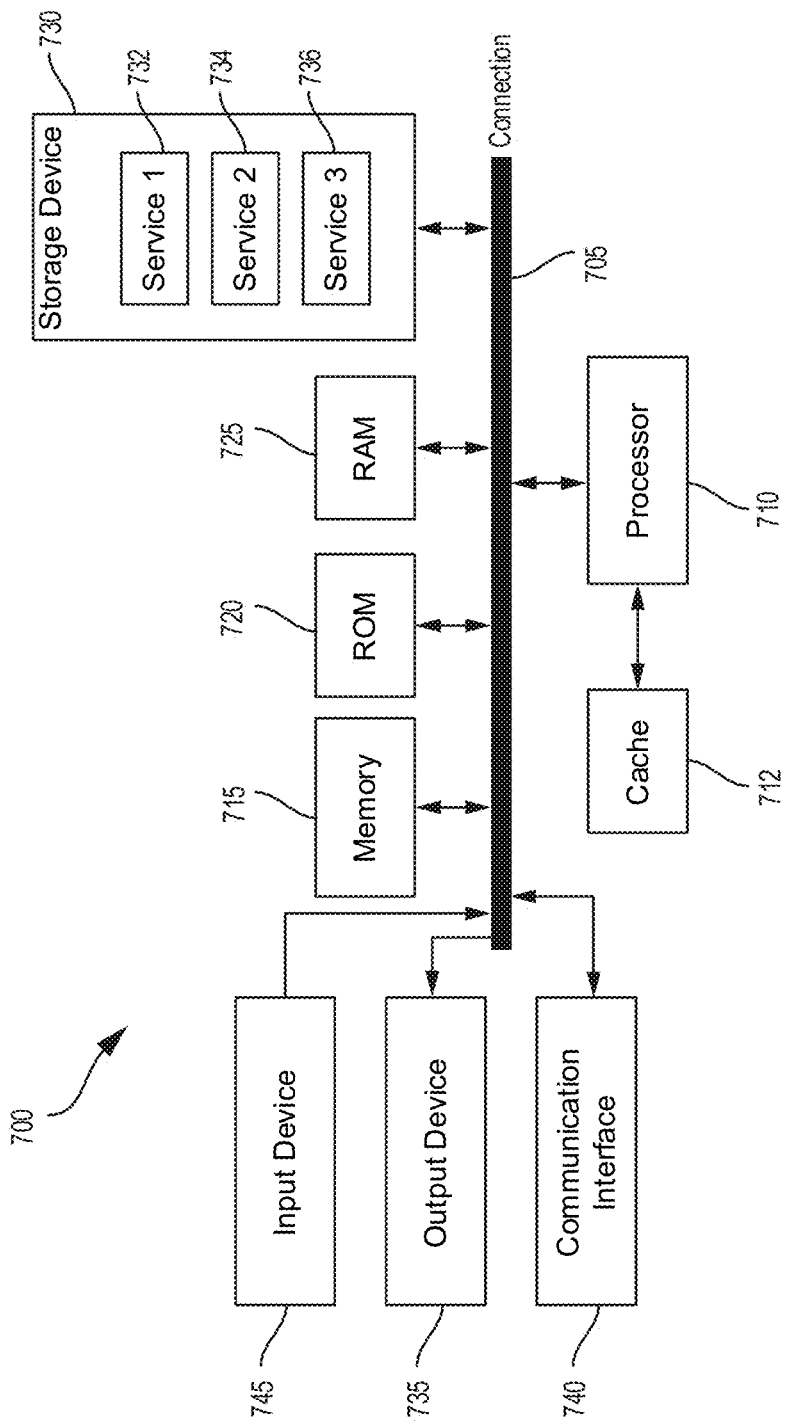
FIG. 7 is a diagram illustrating an example system architecture for implementing certain aspects described herein.

FIG. 7 illustrates an example computing device architecture 700 of an example computing device which can implement various techniques described herein. For example, the computing device architecture 700 can implement at least some portions of the image processing system 100 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service (e.g., service 1 732, service 2 734, and service 3 736) stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include service 732, service 734, and service 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: An apparatus comprising: memory and one or more processors coupled to the memory, the one or more processors being configured to: receive an image of a target and metadata, the metadata associated with at least one of the image and an image capture device that captured the image; determine, based on the image and the metadata, first three-dimensional (3D) mesh parameters of a first 3D mesh of the target, the first 3D mesh parameters and the first 3D mesh corresponding to a first reference frame associated with at least one of the image and the image capture device; and determine, based on the first 3D mesh parameters, second 3D mesh parameters for a second 3D mesh of the target, the second 3D mesh parameters and the second 3D mesh corresponding to a second reference frame, the second reference frame comprising a 3D coordinate system of a real-world scene in which the target is located.

Aspect 2: The apparatus of Aspect 1, wherein the one or more processors are configured to: update one or more parameters associated with a neural network system based on one or more losses associated with a third 3D mesh of the target in a real-world reference frame; and determine, by the neural network system using the updated one or more parameters, the second 3D mesh parameters for the second 3D mesh of the target.

Aspect 3: The apparatus of Aspect 2, wherein the one or more processors are configured to: determine the third 3D mesh of the target based on at least one of a non-parametric mesh of the target, a parametric mesh of the target, rotation parameters, translation parameters, image features and metadata features.

Aspect 4: The apparatus of Aspect 3, wherein the one or more processors are configured to: determine, based on an additional image of the target and additional metadata, the image features and the metadata features; determine, based on the image features and the metadata features, the non-parametric mesh of the target and mesh parameters associated with the target; and determine, based on pose parameters and shape parameters associated with the target, the parametric mesh of the target.

Aspect 5: The apparatus of Aspect 4, wherein the mesh parameters comprise at least one of pose parameters, shape parameters, rotation parameters, and translation parameters.

Aspect 6: The apparatus of Aspect 4, wherein the parametric mesh, the non-parametric mesh and the mesh parameters correspond to a particular reference frame of a device that captured the additional image, and wherein the one or more losses comprise at least one of a loss of the third 3D mesh, a loss of 3D keypoints in the third 3D mesh, a pose and shape regularization loss, and a loss of two-dimensional (2D) keypoint projections from at least one of the third 3D mesh and the 3D keypoints.

Aspect 7: The apparatus of Aspect 4, wherein the metadata features comprise intrinsic parameters associated with a device that captured the additional image, the intrinsic parameters comprising at least one of a focal length of the device, an optical center of the device, a skew of the device, a size of the additional image, a lens distortion associated with the device, and a particular reference frame of the device.

Aspect 8: The apparatus of any of Aspects 3 to 7, wherein the one or more processors are configured to: train the neural network system using the non-parametric mesh of the target and the parametric mesh of the target.

Aspect 9: The apparatus of any of Aspects 1 to 8, wherein the one or more processors are configured to generate the second 3D mesh of the target based on the second 3D mesh parameters, wherein the second 3D mesh is in the 3D coordinate system of the real-world scene.

Aspect 10: The apparatus of Aspect 9, wherein the second 3D mesh comprises at least one of a skinned mesh model and a parametric mesh model, and wherein the target comprises an articulated object.

Aspect 11: The apparatus of any of Aspects 1 to 10, wherein, to determine the second 3D mesh parameters, the one or more processors are configured to: transform one or more of the first 3D mesh parameters from the first reference frame to the second reference frame.

Aspect 12: The apparatus of any of Aspects 1 to 11, wherein, to determine the second 3D mesh parameters, the one or more processors are configured to: determine a rotation and translation of the first 3D mesh from the first reference frame to the second reference frame.

Aspect 13: The apparatus of any of Aspects 1 to 12, wherein, to determine the second 3D mesh parameters, the one or more processors are configured to: identify 3D keypoints associated with the first 3D mesh of the target; and based on the image and the metadata, determine locations and orientations of the 3D keypoints in the 3D coordinate system of the real-world scene.

Aspect 14: The apparatus of any of Aspects 1 to 13, wherein the first 3D mesh parameters comprise pose parameters, shape parameters, translation parameters, location parameters, and visibility parameters, and wherein the visibility parameters indicate at least one of an estimated visibility of one or more points in the first 3D mesh and an estimated occlusion of the one or more points in the first 3D mesh.

Aspect 15: The apparatus of any of Aspects 1 to 14, wherein the metadata comprises intrinsic parameters associated with the image capture device, the intrinsic parameters comprising at least one of a focal length of the image capture device, an optical center of the image capture device, a skew of the image capture device, a size of the image, a lens distortion associated with the image capture device, a respective reference frame of the image capture device, the respective reference frame comprising the first reference frame.

Aspect 16: The apparatus of Aspect 15, wherein the image comprises a cropped monocular image, and wherein the metadata comprises a location of a bounding box around the target in the cropped monocular image.

Aspect 17: The apparatus of any of Aspects 1 to 16, wherein the apparatus comprises the image capture device, and wherein the image capture device comprises a camera device.

Aspect 18: The apparatus of any of Aspects 1 to 17, wherein the apparatus comprises a mobile device.

Aspect 19: The apparatus of any of Aspects 1 to 18, wherein the one or more processors are configured to: determine image features in the image of the target; determine metadata features and image features based the image and the metadata; and determine the first 3D mesh parameters based on a combination of the metadata features and the image features, the first 3D mesh parameters comprising at least one of pose parameters, shape parameters, translation parameters, location parameters, and visibility parameters, wherein the visibility parameters indicate at least one of an estimated visibility of one or more points in the first 3D mesh and an estimated occlusion of the one or more points in the first 3D mesh.

Aspect 20: A method comprising: receiving an image of a target and metadata, the metadata associated with at least one of the image and an image capture device that captured the image; determining, based on the image and the metadata, first three-dimensional (3D) mesh parameters of a first 3D mesh of the target, the first 3D mesh parameters and the first 3D mesh corresponding to a first reference frame associated with at least one of the image and the image capture device; and determining, based on the first 3D mesh parameters, second 3D mesh parameters for a second 3D mesh of the target, the second 3D mesh parameters and the second 3D mesh corresponding to a second reference frame, the second reference frame comprising a 3D coordinate system of a real-world scene in which the target is located.

Aspect 21: The method of Aspect 20, further comprising: updating one or more parameters associated with a neural network system based on one or more losses associated with a third 3D mesh of the target in a real-world reference frame; and determining, by the neural network system using the updated one or more parameters, the second 3D mesh parameters for the second 3D mesh of the target.

Aspect 22: The method of Aspect 21, further comprising: determining the third 3D mesh of the target based on at least one of a non-parametric mesh of the target, a parametric mesh of the target, rotation parameters, translation parameters, image features and metadata features.

Aspect 23: The method of Aspect 22, further comprising: determining, based on an additional image of the target and additional metadata, the image features and the metadata features; determining, based on the image features and the metadata features, the non-parametric mesh of the target and mesh parameters associated with the target; and determining, based on pose parameters and shape parameters associated with the target, the parametric mesh of the target.

Aspect 24: The method of Aspect 23, wherein the mesh parameters comprise at least one of pose parameters, shape parameters, rotation parameters, and translation parameters.

Aspect 25: The method of any of Aspects 23 to 24, wherein the parametric mesh, the non-parametric mesh and the mesh parameters correspond to a particular reference frame of a device that captured the additional image, and wherein the one or more losses comprise at least one of a loss of the third 3D mesh, a loss of 3D keypoints in the third 3D mesh, a pose and shape regularization loss, and a loss of two-dimensional (2D) keypoint projections from at least one of the third 3D mesh and the 3D keypoints.

Aspect 26: The method of any of Aspects 23 to 25, wherein the metadata features comprise intrinsic parameters associated with a device that captured the additional image, the intrinsic parameters comprising at least one of a focal length of the device, an optical center of the device, a skew of the device, a size of the additional image, a lens distortion associated with the device, and a particular reference frame of the device.

Aspect 27: The method of any of Aspects 22 to 26, further comprising: training the neural network system using the non-parametric mesh of the target and the parametric mesh of the target.

Aspect 28: The method of any of Aspects 20 to 27, further comprising: generating the second 3D mesh of the target based on the second 3D mesh parameters, wherein the second 3D mesh is in the 3D coordinate system of the real-world scene.

Aspect 29: The method of Aspect 28, wherein the second 3D mesh comprises at least one of a skinned mesh model and a parametric mesh model, and wherein the target comprises an articulated object.

Aspect 30: The method of any of Aspects 20 to 29, wherein determining the second 3D mesh parameters comprises: transforming one or more of the first 3D mesh parameters from the first reference frame to the second reference frame.

Aspect 31: The method of any of Aspects 20 to 30, wherein determining the second 3D mesh parameters comprises: determining a rotation and translation of the first 3D mesh from the first reference frame to the second reference frame.

Aspect 32: The method of any of Aspects 20 to 31, wherein determining the second 3D mesh parameters comprises: identifying 3D keypoints associated with the first 3D mesh of the target; and based on the image and the metadata, determining locations and orientations of the 3D keypoints in the 3D coordinate system of the real-world scene.

Aspect 33: The method of any of Aspects 20 to 32, wherein the first 3D mesh parameters comprise pose parameters, shape parameters, translation parameters, location parameters, and visibility parameters, and wherein the visibility parameters indicate at least one of an estimated visibility of one or more points in the first 3D mesh and an estimated occlusion of the one or more points in the first 3D mesh.

Aspect 34: The method of any of Aspects 20 to 33, wherein the metadata comprises intrinsic parameters associated with the image capture device, the intrinsic parameters comprising at least one of a focal length of the image capture device, an optical center of the image capture device, a skew of the image capture device, a size of the image, a lens distortion associated with the image capture device, a respective reference frame of the image capture device, the respective reference frame comprising the first reference frame.

Aspect 35: The method of Aspect 34, wherein the image comprises a cropped monocular image, and wherein the metadata comprises a location of a bounding box around the target in the cropped monocular image.

Aspect 36: The method of any of Aspects 20 to 35, further comprising: determining image features in the image of the target; determining metadata features and image features based the image and the metadata; and determining the first 3D mesh parameters based on a combination of the metadata features and the image features, the first 3D mesh parameters comprising at least one of pose parameters, shape parameters, translation parameters, location parameters, and visibility parameters, wherein the visibility parameters indicate at least one of an estimated visibility of one or more points in the first 3D mesh and an estimated occlusion of the one or more points in the first 3D mesh.

Aspect 37: A non-transitory computer-readable medium having stored thereon instructions which, when executed by one or more processors, cause the one or more processors to perform operations according to any of Aspects 20 to 36.

Aspect 38: An apparatus comprising means for performing operations according to any of Aspects 20 to 36.

What is claimed is:

1. A apparatus comprising:
   memory; and
   one or more processors coupled to the memory, the one or more processors being configured to:
   update one or more parameters associated with a neural network system based on one or more losses associated with a 3D mesh of a target;
   receive metadata and an image of the target in a real-world scene, the metadata associated with at least one of the image and an image capture device that captured the image;
   determine, based on the image and the metadata, first three-dimensional (3D) mesh parameters of a first 3D mesh of the target the first 3D mesh parameters and the first 3D mesh corresponding to a first reference frame associated with at least one of the image and the image capture device; and
   determine, based on the first 3D mesh parameters and the updated one or more parameters associated with the neural network system, second 3D mesh parameters for a second 3D mesh of the target, the second 3D mesh parameters and the second 3D mesh corresponding to a second reference frame, the second reference frame corresponding to a 3D coordinate system of the real-world scene.

2. The apparatus of claim 1, wherein the one or more processors are configured to:
   determine the third 3D mesh of the target based on at least one of a non-parametric mesh of the target, a parametric mesh of the target, rotation parameters, translation parameters, image features and metadata features.

3. The apparatus of claim 2, wherein the one or more processors are configured to:
   determine, based on an additional image of the target and additional metadata, the image features and the metadata features;
   determine, based on the image features and the metadata features, the non-parametric mesh of the target and mesh parameters associated with the target; and
   determine, based on pose parameters and shape parameters associated with the target, the parametric mesh of the target.

4. The apparatus of claim 3, wherein the mesh parameters comprise at least one of pose parameters, shape parameters, rotation parameters, and translation parameters.

5. The apparatus of claim 3, wherein the parametric mesh, the non-parametric mesh and the mesh parameters correspond to a particular reference frame of a device that captured the additional image, and wherein the one or more losses comprise at least one of a loss of the third 3D mesh, a loss of 3D keypoints in the third 3D mesh, a pose and shape regularization loss, and a loss of two-dimensional (2D) keypoint projections from at least one of the third 3D mesh and the 3D keypoints.

6. The apparatus of claim 3, wherein the metadata features comprise intrinsic parameters associated with a device that captured the additional image, the intrinsic parameters comprising at least one of a focal length of the device, an optical center of the device, a skew of the device, a size of the additional image, a lens distortion associated with the device, and a particular reference frame of the device.

7. The apparatus of claim 2, wherein the one or more processors are configured to:
train the neural network system using the non-parametric mesh of the target and the parametric mesh of the target.

8. The apparatus of claim 1, wherein the one or more processors are configured to generate the second 3D mesh of the target based on the second 3D mesh parameters, wherein the second 3D mesh is in the 3D coordinate system of the real-world scene.

9. The apparatus of claim 8, wherein the second 3D mesh comprises at least one of a skinned mesh model and a parametric mesh model, and wherein the target comprises an articulated object.

10. The apparatus of claim 1, wherein, to determine the second 3D mesh parameters, the one or more processors are configured to:
transform one or more of the first 3D mesh parameters from the first reference frame to the second reference frame.

11. The apparatus of claim 1, wherein, to determine the second 3D mesh parameters, the one or more processors are configured to:
determine a rotation and translation of the first 3D mesh from the first reference frame to the second reference frame.

12. The apparatus of claim 1, wherein, to determine the second 3D mesh parameters, the one or more processors are configured to:
identify 3D keypoints associated with the first 3D mesh of the target; and
based on the image and the metadata, determine locations and orientations of the 3D keypoints in the 3D coordinate system of the real-world scene.

13. The apparatus of claim 1, wherein the first 3D mesh parameters comprise pose parameters, shape parameters, translation parameters, location parameters, and visibility parameters, and wherein the visibility parameters indicate at least one of an estimated visibility of one or more points in the first 3D mesh and an estimated occlusion of the one or more points in the first 3D mesh.

14. The apparatus of claim 1, wherein the metadata comprises intrinsic parameters associated with the image capture device, the intrinsic parameters comprising at least one of a focal length of the image capture device, an optical center of the image capture device, a skew of the image capture device, a size of the image, a lens distortion associated with the image capture device, a respective reference frame of the image capture device, the respective reference frame comprising the first reference frame.

15. The apparatus of claim 14, wherein the image comprises a cropped monocular image, and wherein the metadata comprises a location of a bounding box around the target in the cropped monocular image.

16. The apparatus of claim 1, wherein the apparatus comprises the image capture device, and wherein the image capture device comprises a camera device.

17. The apparatus of claim 1, wherein the apparatus comprises a mobile device.

18. The apparatus of claim 1, wherein the one or more processors are configured to:
determine image features in the image of the target;
determine metadata features and image features based the image and the metadata; and
determine the first 3D mesh parameters based on a combination of the metadata features and the image features, the first 3D mesh parameters comprising at least one of pose parameters, shape parameters, translation parameters, location parameters, and visibility parameters, wherein the visibility parameters indicate at least one of an estimated visibility of one or more points in the first 3D mesh and an estimated occlusion of the one or more points in the first 3D mesh.

19. A method comprising:
updating one or more parameters associated with a neural network system based on one or more losses associated with a 3D mesh of a target;
receiving metadata and an image of the target in a real-world scene, the metadata associated with at least one of the image and an image capture device that captured the image;
determining, based on the image and the metadata, first three-dimensional (3D) mesh parameters of a first 3D mesh of the target, the first 3D mesh parameters and the first 3D mesh corresponding to a first reference frame associated with at least one of the image and the image capture device; and
determining, based on the first 3D mesh parameters, second 3D mesh parameters for a second 3D mesh of the target, the second 3D mesh parameters and the second 3D mesh corresponding to a second reference frame, the second reference frame corresponding to a 3D coordinate system of the real-world scene.

20. The method of claim 19, further comprising:
determining the third 3D mesh of the target based on at least one of a non-parametric mesh of the target, a parametric mesh of the target, rotation parameters, translation parameters, image features and metadata features.

21. The method of claim 20, further comprising:
determining, based on an additional image of the target, and additional metadata, the image features and the metadata features;
determining, based on the image features and the metadata features, the non-parametric mesh of the target and mesh parameters associated with the target; and
determining, based on pose parameters and shape parameters associated with the target, the parametric mesh of the target, wherein the mesh parameters comprise at least one of pose parameters, shape parameters, rotation parameters, and translation parameters.

22. The method of claim 21, wherein the parametric mesh, the non-parametric mesh and the mesh parameters correspond to a particular reference frame of a device that captured the additional image, and wherein the one or more losses comprise at least one of a loss of the third 3D mesh, a loss of 3D keypoints in the third 3D mesh, a pose and shape regularization loss, and a loss of two-dimensional (2D) keypoint projections from at least one of the third 3D mesh and the 3D keypoints.

23. The method of claim 21, wherein the metadata features comprise intrinsic parameters associated with a device that captured the additional image, the intrinsic parameters comprising at least one of a focal length of the device, an optical center of the device, a skew of the device, a size of the additional image, a lens distortion associated with the device, and a particular reference frame of the device, the method further comprising training the neural network system using the non-parametric mesh of the target and the parametric mesh of the target.

24. The method of claim 19, further comprising: generating the second 3D mesh of the target based on the second 3D mesh parameters, wherein the second 3D mesh is in the 3D coordinate system of the real-world scene, wherein the second 3D mesh comprises at least one of a skinned mesh model and a parametric mesh model, wherein the target comprises an articulated object, and wherein the first 3D mesh parameters comprise pose parameters, shape parameters, translation parameters, location parameters, and visibility parameters, the visibility parameters indicating at least one of an estimated visibility of one or more points in the first 3D mesh and an estimated occlusion of the one or more points in the first 3D mesh.

25. The method of claim 19, wherein determining the second 3D mesh parameters comprises at least one of:
- transforming one or more of the first 3D mesh parameters from the first reference frame to the second reference frame; and
- determining a rotation and translation of the first 3D mesh from the first reference frame to the second reference frame.

26. The method of claim 19, wherein the metadata comprises intrinsic parameters associated with the image capture device, wherein the image comprises a monocular image, wherein the metadata comprises a location of a bounding box around the target in the monocular image, the intrinsic parameters comprising at least one of a focal length of the image capture device, an optical center of the image capture device, a skew of the image capture device, a size of the image, a lens distortion associated with the image capture device, a respective reference frame of the image capture device comprising the first reference frame.

27. The method of claim 19, further comprising:
- determining image features in the image of the target;
- determining metadata features and image features based the image and the metadata; and
- determining the first 3D mesh parameters based on a combination of the metadata features and the image features, the first 3D mesh parameters comprising at least one of pose parameters, shape parameters, translation parameters, location parameters, and visibility parameters, wherein the visibility parameters indicate at least one of an estimated visibility of one or more points in the first 3D mesh and an estimated occlusion of the one or more points in the first 3D mesh.

28. A non-transitory computer-readable medium having stored thereon instructions which, when executed by one or more processors, cause the one or more processors to:
- update one or more parameters associated with a neural network system based on one or more losses associated with a 3D mesh of a target;
- receive metadata and an image of the target in a real-world scene, the metadata associated with at least one of the image and an image capture device that captured the image;
- determine, based on the image and the metadata, first three-dimensional (3D) mesh parameters of a first 3D mesh of the target, the first 3D mesh parameters and the first 3D mesh corresponding to a first reference frame associated with at least one of the image and the image capture device; and
- determine, based on the first 3D mesh parameters and the updated one or more parameters associated with the neural network system, second 3D mesh parameters for a second 3D mesh of the target, the second 3D mesh, parameters and the second 3D mesh corresponding to a second reference frame, the second reference frame corresponding to a 3D coordinate system of the real-world scene.

* * * * *